(12) United States Patent
Katoh et al.

(10) Patent No.: US 9,352,634 B2
(45) Date of Patent: May 31, 2016

(54) AIR CONDITIONER FOR A VEHICLE USING A COMPOSITE HEAT EXCHANGER

(75) Inventors: Yoshiki Katoh, Chita-gun (JP); Satoshi Itoh, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 297 days.

(21) Appl. No.: 13/435,574

(22) Filed: Mar. 30, 2012

(65) Prior Publication Data

US 2012/0261110 A1 Oct. 18, 2012

(30) Foreign Application Priority Data

Apr. 4, 2011 (JP) ................... 2011-082760

(51) Int. Cl.
*B60H 1/32* (2006.01)
*B60H 1/00* (2006.01)
*F28F 9/02* (2006.01)
*F28D 1/053* (2006.01)

(52) U.S. Cl.
CPC ........ *B60H 1/00328* (2013.01); *B60H 1/00335* (2013.01); *F28D 1/05391* (2013.01); *F28F 9/0214* (2013.01); *F28F 9/0246* (2013.01)

(58) Field of Classification Search
CPC ............ B60H 1/00328; B60H 1/00335; F28D 1/05391; F28F 9/0214; F28F 9/0246
USPC ......................................................... 62/239
See application file for complete search history.

(56) References Cited

U.S. PATENT DOCUMENTS

| 5,507,153 A | * | 4/1996 | Seto et al. ................ 62/133 |
| 5,769,316 A | * | 6/1998 | Ikeda et al. ............... 237/2 B |
| 6,422,308 B1 | * | 7/2002 | Okawara et al. ............. 165/202 |
| 2003/0182955 A1 | | 10/2003 | Hirao et al. |
| 2004/0011068 A1 | | 1/2004 | Hatakeyama |
| 2004/0060316 A1 | | 4/2004 | Ito et al. |

(Continued)

FOREIGN PATENT DOCUMENTS

| JP | 05272882 A | * 10/1993 |
| JP | 08-159687 | 6/1996 |
| JP | 3275415 | 4/2002 |

(Continued)

OTHER PUBLICATIONS

Office action dated Mar. 3, 2014 in corresponding Chinese Application No. 2012 10092949.X.

Office Action dated Oct. 21, 2014 in the corresponding Chinese Application No. 201210092949.X with English translation.

*Primary Examiner* — Marc Norman
*Assistant Examiner* — Ana Vazquez
(74) *Attorney, Agent, or Firm* — Harness, Dickey & Pierce, P.L.C.

(57) ABSTRACT

A composite heat exchanger includes a first heat exchanger configured to exchange heat between feed air and a refrigerant, and a second heat exchanger configured to exchange heat between the feed air and engine coolant. The composite heat exchanger is integrated so as to enable heat transfer between discharge refrigerant flowing through the first heat exchanger and the coolant flowing through the second heat exchanger. Furthermore, the composite heat exchanger is configured to change an amount of the heat exchanged among the feed air, the discharge refrigerant and the coolant in the composite heat exchanger by changing at least one of a volume of the feed air, a refrigerant discharge capacity of the compression mechanism, and an inflow amount of the heat medium.

16 Claims, 7 Drawing Sheets

(56) References Cited

U.S. PATENT DOCUMENTS

2004/0079102 A1* 4/2004 Umebayashi et al. ....... 62/324.1
2008/0041071 A1* 2/2008 Itoh .................................. 62/79
2009/0183697 A1* 7/2009 Inui ........................... 123/41.02

FOREIGN PATENT DOCUMENTS

| | | |
|---|---|---|
| JP | 2002-225535 | 8/2002 |
| JP | 2002-354608 | 12/2002 |
| JP | 2003-335129 | 11/2003 |

* cited by examiner

AIR CONDITIONER FOR A VEHICLE USING A COMPOSITE HEAT EXCHANGER

CROSS REFERENCE TO RELATED APPLICATION

This application is based on Japanese Patent Application No. 2011-082760 filed on Apr. 4, 2011, the contents of which are incorporated herein by reference in its entirety.

TECHNICAL FIELD

The present disclosure relates to an air conditioner for a vehicle, including a composite heat exchanger capable of exchanging heat between plural kinds of fluids.

BACKGROUND

Conventionally, air conditioners for vehicles with a composite heat exchanger capable of exchanging heat between plural kinds of fluids are disclosed (see, for example, Patent Documents 1 and 2).

Specifically, Patent Document 1 (JP 3275415 B2) discloses regarding an air conditioner for a vehicle with a composite heat exchanger. The composite heat exchanger includes the combination of a heat exchanger for heating and a heater core. The heat exchanger exchanges heat between a refrigerant discharged from a compressor (high-pressure refrigerant) and a feed air blown into a vehicle interior (hereinafter referred to as a vehicle-interior feed air) to thereby heat the vehicle-interior feed air. The heater core exchanges heat between brine (heating medium) heated by a combustion hot-water heater and the vehicle-interior feed air to thereby heat the feed air.

Patent Document 2 (US 2004/0060316 A1 corresponding to JP 431115 B2) discloses another air conditioner for a vehicle with a composite heat exchanger. The composite heat exchanger includes the combination of the same heat exchanger for heating as that disclosed in Patent Document 1, and a heat core that exchanges heat between an engine coolant (heating medium) for cooling an engine and the vehicle-interior feed air to thereby heat the feed air.

Both Patent Documents 1 and 2, however, only disclose the air conditioner for a vehicle that heats the feed air in the vehicle interior by dissipating heat of the high-pressure refrigerant or heat medium having a higher temperature than that of the vehicle interior by means of the composite heat exchanger. That is, the air conditioner for the vehicle disclosed in each of Patent Documents 1 and 2 is provided with the composite heat exchanger only for heating the vehicle-interior feed air with the heat contained in the high-pressure refrigerant or heat medium, and not for the purpose of exchanging positively heat between the high-pressure refrigerant and the heat medium. The air conditioner disclosed cannot effectively utilize the heat contained in respective fluids.

SUMMARY

The present disclosure has been made in view of the foregoing matters, and it is an object of the present disclosure to provide an air conditioner for a vehicle that can effectively use the heat contained in plural kinds of fluids by achieving the appropriate heat exchange between the fluids in a composite heat exchanger.

According to an aspect of the present disclosure, an air conditioner for a vehicle includes: a blower which blows air into a vehicle interior; a casing forming an air passage through which feed air blown by the blower flows; a composite heat exchanger disposed in the casing, the composite heat exchanger including a first heat exchanger configured to exchange heat between the feed air and a discharge refrigerant discharged from a compression mechanism for compressing a refrigerant in a refrigeration cycle, and a second heat exchanger configured to exchange heat between the feed air and a heat medium for adjusting a temperature of an external heat source device that generates heat in operation; a feed air volume adjustment portion disposed to adjust a volume of the feed air blown into the composite heat exchanger; a discharge capacity changing portion configured to change a refrigerant discharge capacity of the compression mechanism; a heat medium pressure-feed portion which pressure-feeds the heat medium; and a heat medium flow-rate adjustment portion which adjusts an inflow amount of the heat medium flowing into the second heat exchanger. Furthermore, the composite heat exchanger includes an integrated combination structure of the first heat exchanger and the second heat exchanger so as to enable heat transfer between the discharge refrigerant flowing through the first heat exchanger and the heat medium flowing through the second heat exchanger. In addition, the composite heat exchanger is configured to change an amount of the heat exchanged among the feed air, the discharge refrigerant and the heat medium in the composite heat exchanger by adjusting at least one of the volume of the feed air, the refrigerant discharge capacity of the compression mechanism, and the inflow amount of the heat medium.

Accordingly, it is possible to adjust the heat exchange amount between the discharge refrigerant and the heat medium, in addition to the amount of the heat exchanged among the feed air, the discharge refrigerant and the heat medium in the composite heat exchanger. Therefore, it is possible to effectively use the heat contained in plural kinds of fluids by achieving the appropriate heat exchange between the fluids in the composite heat exchanger.

BRIEF DESCRIPTION OF THE DRAWINGS

The above and other objects, the features and the advantages of the present disclosure will become more apparent by describing in detail below the embodiments of the present disclosure with reference to the attached drawings in which.

DETAILED DESCRIPTION

Figure 1:
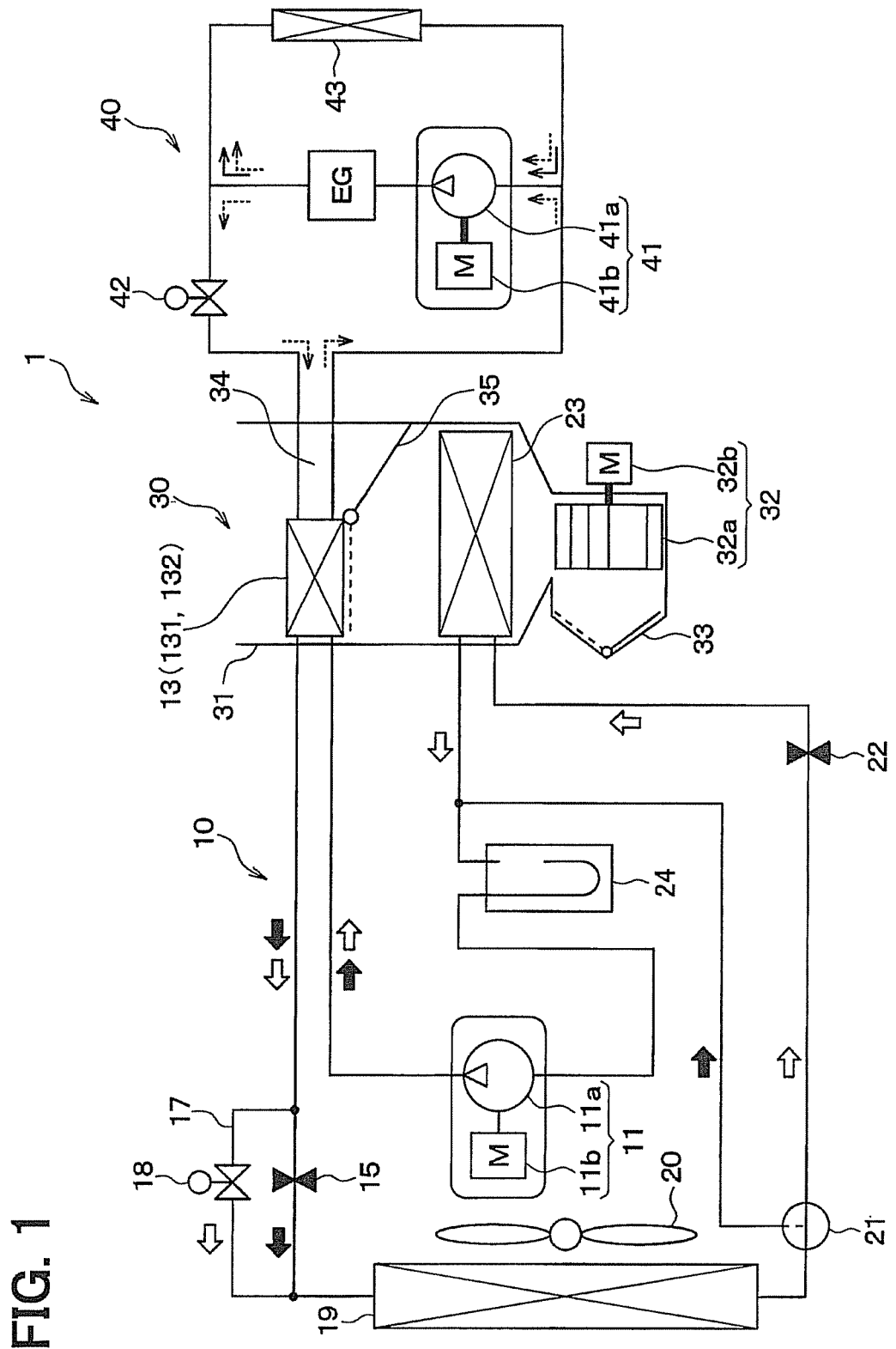
FIG. 1 is a schematic diagram of an air conditioner for a vehicle according to a first embodiment.

Embodiments of the present disclosure will be described below with reference to the accompanying drawings. In the following embodiments, the same or equivalent parts are designated by the same reference character in the figures.

(First Embodiment)

A first embodiment of the invention in the present application will be described below based on FIGS. 1 to 6. An air conditioner for a vehicle in this embodiment of the invention is applied to the so-called hybrid vehicle which obtains a driving force for traveling of the vehicle from both an internal combustion engine (simply, engine) EG and an electric motor for traveling.

The hybrid vehicle can switch between a travel state of obtaining the driving force from both the engine and the electric motor for traveling upon traveling by operating or stopping the engine according to traveling loads or the like of the vehicle, and another travel state of obtaining the driving force only from the electric motor for traveling by stopping the engine. Thus, the hybrid vehicle can improve the vehicle fuel efficiency as compared to a normal vehicle that obtains the driving force for traveling of the vehicle only from an engine.

An air conditioner for a vehicle 1 of this embodiment includes a heat pump cycle 10 which is a vapor compression refrigerating cycle, an indoor air conditioning unit 30, and a coolant circulation circuit (heating medium circulation circuit) 40 for circulating a coolant (heating medium) for cooling the engine EG as an external heat source device.

The heat pump cycle 10 of this embodiment in the air conditioner for a vehicle 1 serves to heat or cool the feed air which is to be blown into the vehicle interior of interest to be air-conditioned in the vehicle. That is, the heat pump cycle 10 can switch between refrigerant flow paths to perform a heating operation for heating an interior of the vehicle by heating the feed air (hereinafter referred to as a "vehicle-interior feed air") to be blown into the vehicle interior, or a cooling operation for cooling the vehicle interior by cooling the feed air in the vehicle.

The heat pump cycle 10 of this embodiment constitutes a subcritical refrigeration cycle which uses a normal chlorofluorocarbon (Freon)-based refrigerant as the refrigerant in such a manner that the pressure of the high-pressure refrigerant does not exceed the critical pressure of the refrigerant. A refrigerating machine oil that circulates through a compressor 11 to be described later is mixed into the refrigerant, and a part of the refrigerating machine oil circulates through the cycle together with the refrigerant.

The compressor 11 is positioned in an engine room (not shown), and is to suck, compress, and discharge the refrigerant in the heat pump cycle 10. The compressor is an electric compressor which drives a fixed displacement compression mechanism 11a having a fixed discharge capacity by use of an electric motor 11b. Specifically, various types of compression mechanisms, such as a scroll type compression mechanism, or a vane compression mechanism, can be employed as the compression mechanism 11a.

The electric motor 11b is one whose operation (number of revolutions) is controlled by a control signal output from a controller (not shown) to be described later. The motor 11b may use either an AC motor or a DC motor. The control of the number of revolutions changes a refrigerant discharge capacity of the compression mechanism 11a. Thus, in this embodiment, the electric motor 11b serves as discharge capacity changing means of the compression mechanism 11a.

The outlet side of the compressor 11 is coupled to the inlet side of a first heat exchanger 131 of a composite heat exchanger 13. The composite heat exchanger 13 is disposed in a casing 31 of the indoor air conditioning unit 30 to be described later. The composite heat exchanger 13 is a heat exchanger for exchanging heat between the indoor feed air and a fluid (refrigerant or coolant) flowing therethrough.

The composite heat exchanger 13 includes the first heat exchanger 131 for exchanging heat between a discharge refrigerant (high-pressure refrigerant) discharged from the compressor 11 and the vehicle indoor feed air, and a second heat exchanger 132 for exchanging heat between a coolant and the vehicle indoor feed air. The detailed structure of the composite heat exchanger 13 will be described later.

A first fixed throttle 15 is coupled to the outlet side of the first heat exchanger 131 in the composite heat exchanger 13. The first fixed throttle 15 serves as a first decompressor for decompressing and expanding the refrigerant flowing from the first heat exchanger 131 of the composite heat exchanger 13 in the heating operation. The first fixed throttle 15 can use an orifice or a capillary tube. The outlet side of the first fixed throttle 15 is coupled to the inlet side of an outdoor heat exchanger 19 to be described later.

A bypass passage 17 for the fixed throttle is coupled to the outlet side of the first heat exchanger 131 in the composite heat exchanger 13. The bypass passage 17 causes a refrigerant flowing from the first heat exchanger 131 to bypass the first fixed throttle 15 and guides the refrigerant into the outdoor heat exchanger 19.

An opening/closing valve 18 for opening and closing the bypass passage 17 for the fixed throttle is disposed in the bypass passage 17 for the fixed throttle. The opening/closing valve 18 is an electromagnetic valve whose opening and closing operations are controlled by a control signal (control voltage) output from the controller to be described later.

The loss in pressure caused when the refrigerant passes through the opening/closing valve 18 is extremely small as compared to the loss caused in pressure when the refrigerant passes through the first fixed throttle 15. Thus, when the opening/closing valve 18 is opened, the refrigerant flowing out of the first heat exchanger 131 of the composite heat exchanger 13 flows into the inlet side of the outdoor heat exchanger 19 via the bypass passage 17 for the fixed throttle. In contrast, when the opening/closing valve 18 is closed, the refrigerant flows into the inlet side of the outdoor heat exchanger 19 via the first fixed throttle 15.

Thus, the opening/closing valve 18 can switch between the refrigerant flow paths of the heat pump cycle 10. The opening/closing valve 18 of this embodiment serves as a refrigerant flow path switch. Alternatively, instead of the opening/closing valve 18, an electric three-way valve or the like may be provided for switching between a refrigerant flow path for coupling the outlet side of the first heat exchanger 131 of the composite heat exchanger 13 to the inlet side of the first fixed throttle 15, and another refrigerant flow path for coupling the outlet side of the composite heat exchanger 13 and the inlet side of the bypass passage 17 for the fixed throttle.

The outdoor heat exchanger 19 is to exchange heat between the refrigerant flowing therethrough and an outside air blown from a blower fan 20. The outdoor heat exchanger 19 is a heat exchanger disposed in an engine room, and which serves as an evaporator for evaporating a low-pressure refrigerant to exhibit a heat absorption effect in the heating operation, and also as a heat sink for dissipating heat from the high-pressure refrigerant in the cooling operation.

The blower fan 20 is an electric blower whose number of revolutions (volume of outdoor feed air) is controlled by a control signal (control voltage) output from the controller to be described later. The blower fan 20 serves as an outdoor air blower for flowing out the outside air toward the outdoor heat exchanger 19.

The outlet side of the outdoor heat exchanger 19 is coupled to an electric three-way valve 21. The three-way valve 21 has its operation controlled by a control signal (control voltage) output from the controller to be described later.

More specifically, in the heating operation, the three-way valve 21 performs switching to the refrigerant flow path for coupling the outlet side of the outdoor heat exchanger 19 to the inlet side of a second fixed throttle 22 to be described later. In contrast, in the cooling operation and in the dehumidification and heating operation, the three-way valve 21 performs switching to the refrigerant flow path for coupling the outlet side of the outdoor heat exchanger 19 to an accumulator 24 to be described later. The three-way valve 21 serves as a refrigerant flow path switch together with the above opening/closing valve 18.

The second fixed throttle 22 is a second decompressor for decompressing and expanding the refrigerant flowing from the outdoor heat exchanger 19 in the operation of flowing the refrigerant. The second fixed throttle 22 has a basic structure as that of the above first fixed throttle 15. The outlet side of the second fixed throttle 22 is coupled to the inlet side of an indoor evaporator 23.

The indoor evaporator 23 is disposed in the casing 31 of the indoor air conditioning unit 30. The indoor evaporator 23 is a heat exchanger for cooling that exchanges heat between the vehicle indoor feed air and the low-pressure refrigerant decompressed and expanded by the second fixed throttle 22 to evaporate the low-pressure refrigerant, thereby cooling the feed air. The outlet side of the indoor evaporator 23 is coupled to the inlet side of the accumulator 24.

The accumulator 24 is a gas-liquid separator for separating the refrigerant flowing thereinto into liquid and gas phases, and for storing therein the excessive refrigerant of the cycle. A vapor-phase refrigerant outlet of the accumulator 24 is coupled to a refrigerant suction side of the compressor 11. Thus, the accumulator 24 serves to suppress the suction of the liquid-phase refrigerant into the compressor 11 to thereby prevent the compression of the liquid in the compressor 11.

Next, the indoor air conditioning unit 30 will be described below. The indoor air conditioning unit 30 is disposed inside a gauge board (instrument panel) at the forefront of the vehicle compartment. The unit 30 accommodates in the casing 31 serving as an outer envelope, a blower 32, the abovementioned composite heat exchanger 13, and the indoor evaporator 23.

The casing 31 forms an air passage of the feed air in the vehicle indoor. The casing 31 is formed of resin (for example, polypropylene) having some degree of elasticity, and excellent strength. An inside/outside air switch 33 for switching between the air (inside air) in the vehicle interior and the outside air to introduce the selected air is disposed on the most upstream side of the feed air flow in the casing 31.

The inside/outside air switch 33 is provided with an inside air inlet for introducing the inside air into the casing 31, and an outside air inlet for introducing the outside air thereinto. Further, the inside/outside air switch 33 has therein an inside/outside air switching door for changing the ratio of volume of the inside air to that of the outside air by continuously adjusting opening areas of the inside air inlet and the outside air inlet.

The blower 32 for blowing the introduced air to the vehicle interior via the inside/outside air switch 33 is disposed on the downstream side of the air flow of the inside/outside air switch 33. The blower 32 is an electric blower which includes a centrifugal multiblade fan (sirocco fan) 32a driven by an electric motor, and whose number of revolutions (volume of feed air) is controlled by a control signal (control voltage) output from a controller to be described later. The centrifugal multiblade fan 32a serves as a blower for blowing the air into the vehicle interior.

The indoor evaporator 23 and the composite heat exchanger 13 are disposed on the downstream side of the air flow of the blower 32, in that order with respect to the flow of the feed air in the vehicle interior. In short, the indoor evaporator 23 is disposed on the upstream side in the flow direction of the vehicle indoor feed air with respect to the composite heat exchanger 13.

A bypass passage 34 for allowing the air passing through the indoor evaporator 23 to bypass the composite heat exchanger 13 is formed in the casing 31.

An air mix door 35 is disposed on the downstream side of the air flow of the indoor evaporator 23 and on the upstream side of the air flow of the composite heat exchanger 13. The air mix door 35 adjusts the rate of volume of the air passing through the composite heat exchanger 13 to that of the air passing through the bypass passage 34 among air having passed through the indoor evaporator 23. A mixing space for mixing the air passing through the composite heat exchanger 13 with the air passing through the bypass passage 34 is provided on the downstream side of the air flow of the composite heat exchanger 13 and the downstream side of the air flow of the bypass passage 34.

An, air outlet (not shown) for blowing the conditioned air mixed in the mixing space, into the vehicle interior as a space of interest to be conditioned is disposed on the most downstream side of the feed air flow in the casing 31. Specifically, the air outlets include a face air outlet from which the conditioned air is blown toward an upper body of a passenger in the vehicle compartment, a foot air outlet from which the conditioned air is blown toward a foot of the passenger, and a defroster air outlet from which the conditioned air is blown toward the inner side of a front windowpane of the vehicle.

The air mix door 35 adjusts the rate of volume of air passing through the composite heat exchanger 13 to that of air passing through the bypass passage 34 to thereby adjust the temperature of conditioned air mixed in the mixing space, thus controlling the temperature of the conditioned air blown from each air outlet. That is, the air mix door 35 serves as feed air volume adjustment means for adjusting the volume of the vehicle-interior feed air to be blown into the composite heat exchanger 13, and as temperature adjustment means for adjusting the temperature of the conditioned air blown into the vehicle interior. The air mix door 35 is driven by a servo motor (not shown) operated based on the control signal output from the controller.

The face air outlet, the foot air outlet, and the defroster air outlet have, at the respective upstream sides of the air flow thereof, a face door (not shown) for adjusting an opening area of the face air outlet, a foot door (not shown) for adjusting an opening area of the foot air outlet, and a defroster door (not shown) for adjusting an opening area of the defroster air outlet, respectively.

The face door, the foot door, and the defroster door serve as air outlet mode switching portion for switching among air outlet modes, and are driven via a link mechanism or the like by a servo motor (not shown) whose operation is controlled by a control signal output from the controller to be described later.

Next, the coolant circulation circuit 40 will be described below. The coolant circulation circuit 40 is a heat medium circulation circuit for allowing the coolant (for example, ethylene glycol aqueous solution) as a heat medium to flow through a coolant passage formed in the engine EG as a vehicle-mounted device generating heat in operation to thereby cool the engine EG.

The coolant circulation circuit 40 of this embodiment is provided with a coolant pump 41, an opening/closing valve 42, a radiator 43, and a second heat exchanger 132 of the composite heat exchanger 13.

The coolant pump 41 is an electric water pump comprised of a pressure-feed mechanism 41a serving as a heat medium pressure-feed portion for pressure-feeding the coolant into a coolant passage formed within the engine EG in the coolant circulation circuit 40, and an electric motor 41b for driving the pressure-feed mechanism 41a. The electric motor 41b of the coolant pump 41 can increase its number of revolutions to thereby increase the inflow amount of coolant flowing into the second heat exchanger 132 of the composite heat exchanger 13.

Thus, the electric motor 41b of the coolant pump 41 of this embodiment serves as the heat medium flow rate adjustment portion. The electric motor 41b of the coolant pump 41 has its number of revolutions controlled by a control signal output from the controller.

The outlet side of the coolant pump 41 is coupled to the inlet side of the radiator 43 and the inlet side of the second heat exchanger 132 of the composite heat exchanger 13. In a heat medium flow path from the coolant pump 41 to the second heat exchanger 132 of the composite heat exchanger 13, the opening/closing valve 42 is provided for opening and closing the heat medium flow path. The opening/closing valve 42 is an electromagnetic valve whose opening and closing operations are controlled by a control signal (control voltage) output from the controller.

In the opened state of the opening/closing valve 42, the coolant pushed and fed by the coolant pump 41 has its temperature increased by the engine EG, and flows into both the inlet side of the radiator 43 and the inlet side of the second heat exchanger 132 of the composite heat exchanger 13. In the closed state of the valve 42, the coolant pushed and fed by the coolant pump 41 has its temperature increased by the engine EG, and flows into the inlet side of the radiator 43.

That is, the coolant circulation circuit 40 of this embodiment can switch a heat medium circuit for allowing the coolant to circulate through the coolant pump 41, the engine EG, the second heat exchanger 132 of the composite heat exchanger 13 and the radiator 43, and the coolant pump 41 in that order, and another heat medium circuit for allowing the coolant to circulate through the coolant pump 41, the engine EG, the radiator 43, and the coolant pump 41 in that order.

In this way, the opening/closing valve 42 can switch between the heat medium flow paths of the coolant circulation circuit 40. Thus, the opening/closing valve 42 of this embodiment serves as the heat medium flow path switch.

In the closed state of the opening/closing valve 42, the coolant does not flow into the second heat exchanger 132 of the composite heat exchanger 13. That is, the inflow amount of the coolant flowing into the second heat exchanger 132 of the composite heat exchanger 13 can be decreased. Thus, the opening/closing valve 42 of this embodiment serves as a heat medium flow rate adjustment portion, together with the electric motor 41b of the coolant pump 41. Instead of the opening/closing valve 42, an electric three-way valve or the like may be provided for switching between the heat medium flow path for coupling the outlet side of the coolant passage formed in the engine EG to the inlet side of the second heat exchanger 132 of the composite heat exchanger 13, and another heat medium flow path for coupling the outlet side of the coolant passage formed in the engine EG and the inlet side of the radiator 43.

The radiator 43 is disposed in an engine room, and exchanges heat between the coolant flowing from the coolant passage formed in the engine EG and the outside air blown from a blower fan (not shown) to thereby dissipate heat of the coolant into the outside air. The blower fan of the radiator 43 has its operation controlled by a control signal output from the controller.

Figure 2:
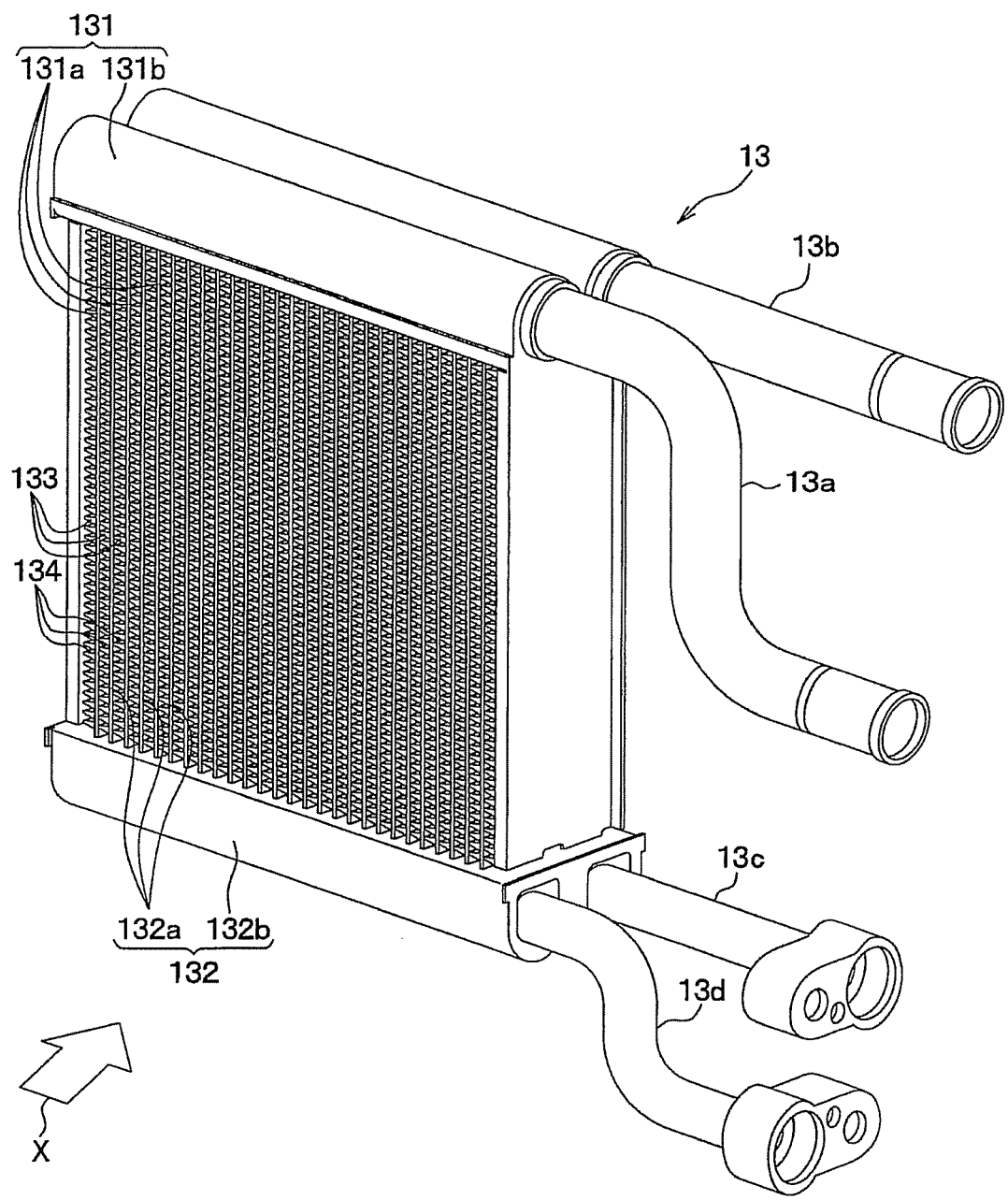
FIG. 2 is a perspective view of the appearance of a composite heat exchanger in the first embodiment.
Figure 3:
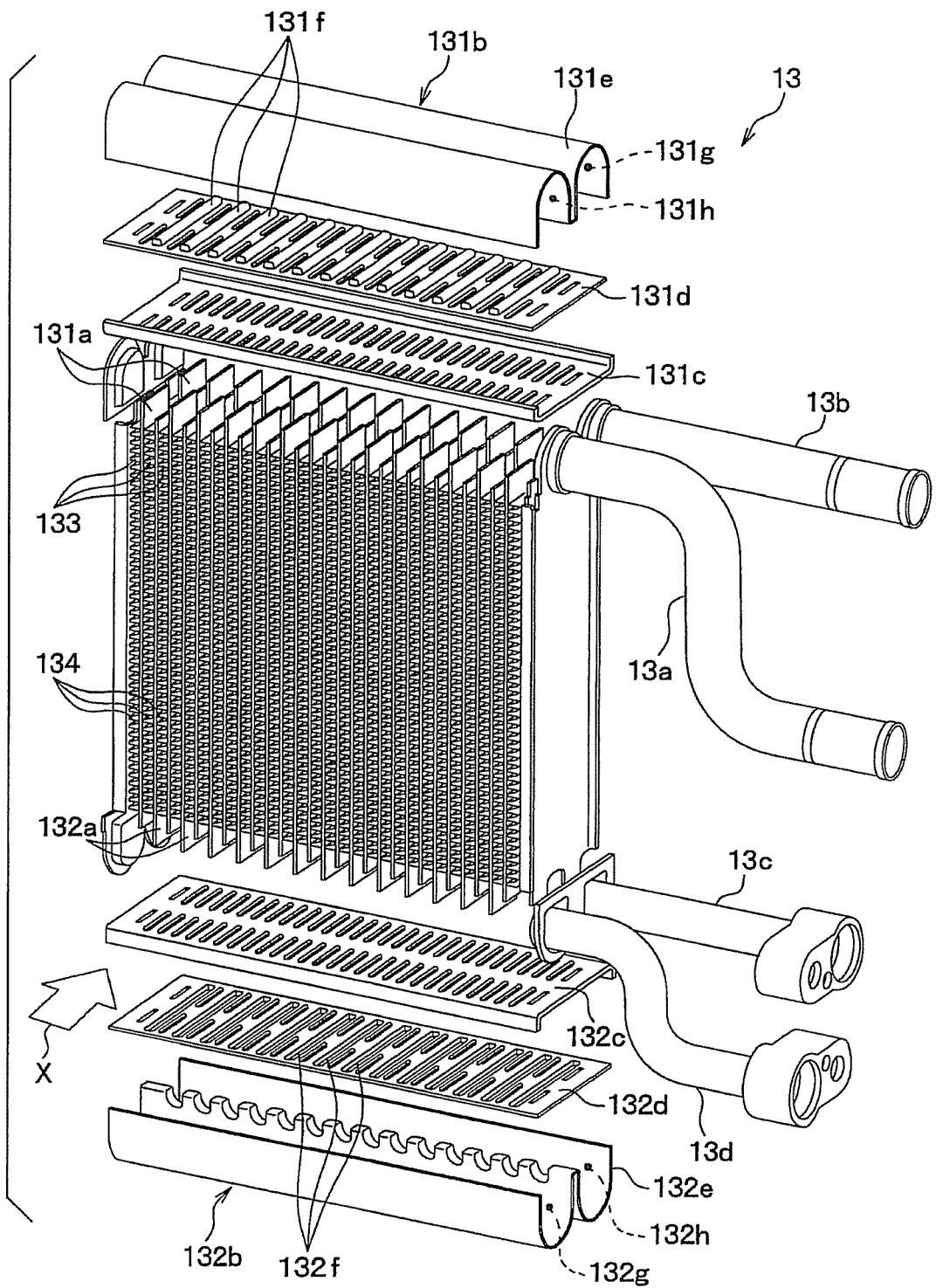
FIG. 3 is an exploded perspective view of the composite heat exchanger in the first embodiment.
Figure 4:
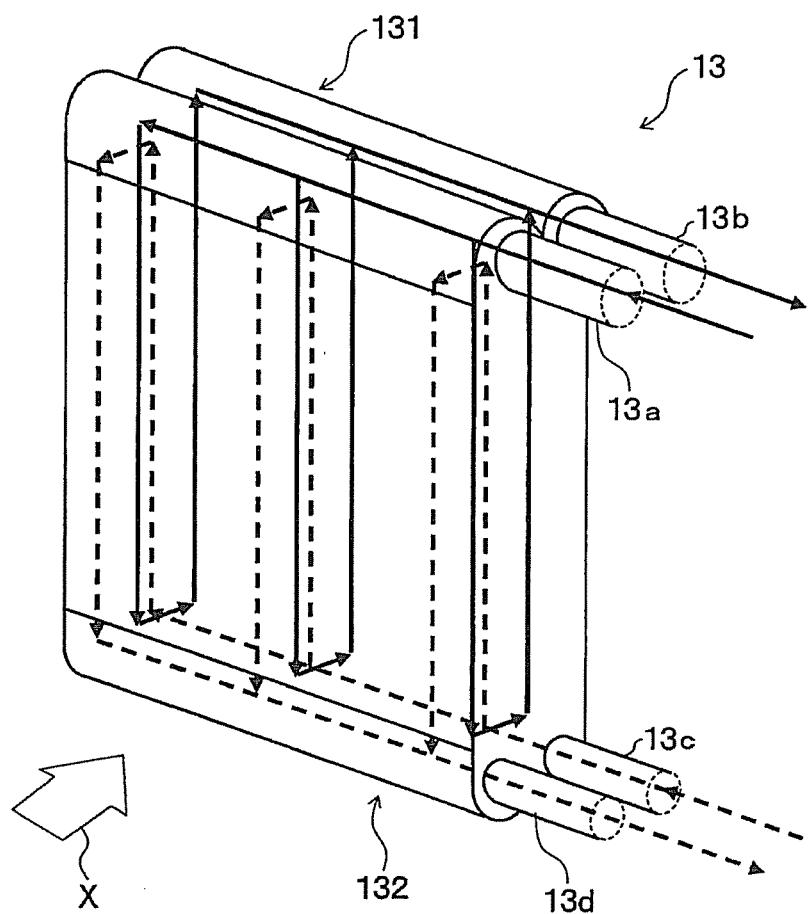
FIG. 4 is a schematic perspective view exemplarily explaining the flows of the refrigerant and coolant in the composite heat exchanger of the first embodiment.

Now, the detailed structure of the composite heat exchanger 13 will be described below with reference to FIGS. 2 to 4. FIG. 2 shows a perspective view of the appearance of the composite heat exchanger 13 according to this embodiment. FIG. 3 shows an exploded perspective view of the composite heat exchanger 13 in this embodiment. FIG. 4 shows an exemplary perspective view for explaining the flows of the refrigerant and the coolant in the composite heat exchanger 13 of this embodiment.

The composite heat exchanger 13 of this embodiment includes a combination of the first heat exchanger 131 and the second heat exchanger 132 such that the vehicle indoor feed air can exchange heat with both the refrigerant discharged from the compression mechanism 11a and the coolant serving as the heat medium.

Each of the first heat exchanger 131 and the second heat exchanger 132 is the so-called tank and tube type heat exchanger which includes a plurality of tubes 131a and 132a for allowing the fluid to flow therethrough, and a pair of tanks 131b and 132b disposed on both ends of the tubes 131a and 132a for gathering or distributing the fluids.

More specifically, the first heat exchanger 131 includes a plurality of tubes 131a for the refrigerant for allowing the refrigerant to flow therethrogh, and a header tank (tank for the refrigerant) 131b extending in the direction perpendicular to the longitudinal direction of the tube 131a for the refrigerant, for gathering or distributing the high-pressure refrigerant flowing through the tubes 131a for the refrigerant. The first heat exchanger 131 is a heat exchanger that exchanges heat between the refrigerant flowing through the tubes 131a for the refrigerant and the vehicle indoor feed air flowing around the tubes 131a for the refrigerant.

The second heat exchanger 132 includes a plurality of tubes 132a for the heat medium for allowing the coolant as the heat medium to flow therethrogh, and a header tank (tank for the heat medium) 132b extending in the direction perpendicular to the longitudinal direction of the tube 132a for the heat medium, for gathering or distributing the low-pressure refrigerant flowing through the tubes 132a for the heat medium. The second heat exchanger 132 is a heat exchanger that exchanges heat between the low-pressure refrigerant flowing through the tubes 132a for the heat medium and the vehicle indoor feed air flowing around the tubes 132a for the heat medium.

Each of the tube 131a for the refrigerant and the tube 132a for the heat medium is comprised, of a flat tube whose cross-section has a flat shape in the direction perpendicular to the longitudinal direction thereof, and is formed of metal with excellent heat conductivity (for example, an aluminum alloy or the like).

The tubes 131a for the refrigerant and the tubes 132a for the heat medium in this embodiment are respectively arranged in two lines along the flow direction X of the feed air from the blower 32. In this embodiment, the tubes 131a for the refrigerant and the tubes 132a for the heat medium are alternately arranged so as to be spaced apart from each other by a predetermined distance such that the respective flat outer surfaces are arranged in parallel to each other. That is, the tubes 131a for the refrigerant are positioned between the tubes 132a for the heat medium, and conversely, the tubes 132a for the heat medium are positioned between the tubes 131a for the refrigerant.

A space formed between the tubes 131a for the refrigerant and the tubes 132a for the heat medium forms a feed air passage 133 through which the feed air in the vehicle interior flows. That is, the feed air passages 133 for allowing the feed air to flow therethrough in the vehicle interior are formed in the outer periphery of the tubes 131a for the refrigerant and in the outer periphery of the tubes 132a for the heat medium.

The feed air passage 133 is provided with outer fins 134 serving as a heat conduction promoting portion for promoting the heat exchange between the refrigerant in the first heat exchanger 131 and the vehicle indoor feed air, and the heat exchange between the coolant in the second heat exchanger 132 and the vehicle indoor feed air, as well as the heat exchange between the refrigerant flowing through the tubes 131a for the refrigerant and the coolant flowing through the tubes 132a for the heat medium. Each outer fin 134 is disposed in contact with the outer surface of the tube 131a for the refrigerant and the tube 132a for the heat medium which are opposed to each other.

The tubes 131a for the refrigerant and the tubes 132a for the heat medium are disposed between the header tank 131b for the refrigerant and the header tank 132b for the heat medium. Specifically, the header tank 131b for the refrigerant is disposed on one end side of the tube 131a for the refrigerant and the tube 132a for the heat medium in the longitudinal direction, and the header tank 132b for the heat medium is disposed on the other end side of the tube 131a for the refrigerant and the tube 132a for the heat medium in the longitudinal direction.

As shown in FIG. 3, the header tank 131b for the refrigerant includes a connection plate 131c for the refrigerant coupled to the respective tubes 131a and 132a arranged in two lines, an intermediate plate 131d for the refrigerant fixed to the connection plate 131c for the refrigerant, and a tank formation member 131e for the refrigerant.

The intermediate plate 131d for the refrigerant is fixed to the connection plate 131c for the refrigerant, and is thus provided with a plurality of recesses 131f having a plurality of spaces for communicating the tubes 132a for the heat medium in two lines with each other via the connection plate 131c for the refrigerant.

Through holes are formed at parts of the intermediate plate 131d for the refrigerant corresponding to the tubes 131a for the refrigerant so as to penetrate the front and back sides of the plate. The tubes 131a for the refrigerant are fitted into the through holes. As to the ends of the tube 131a for the refrigerant and the tube 132a for the heat medium on the header tank 131b side, the tube 131a for the refrigerant protrudes toward the tank formation member 131e for the refrigerant as compared to the tube 132a for the heat medium.

The tank formation member 131e for the refrigerant is fixed to the connection plate 131c for the refrigerant and the intermediate plate 131d for the refrigerant to thereby form a gathering space 131g for the tank for gathering the refrigerants therein, and a distribution space 131h for distributing the refrigerants. Specifically, the tank formation member 131e for the refrigerant is formed into a double mountain shape (W-like shape) as viewed from the longitudinal direction by pressing a metal plate.

The center part of the double mountain shape of the tank formation member 131e for the refrigerant comes into contact with the intermediate plate 131d for the refrigerant to partition a space into the gathering space 131g and the distribution space 131h. In this embodiment, the gathering space 131g is disposed on the downwind side in the flow direction X of the feed air, and the distribution space 131h is disposed on the upwind side thereof.

One end of the tank formation member 131e for the refrigerant in the longitudinal direction is coupled to an inlet pipe (refrigerant introducing portion) 13a for the refrigerant for allowing the refrigerant to flow into the distribution space 131h, and an outlet pipe (refrigerant deriving portion) 13b for the refrigerant for allowing the refrigerant to flow out of the gathering space 131g. The other end of the tank formation member 131e for the refrigerant in the longitudinal direction is closed with a closing member.

The header tank portion 132b for the heat medium has basically the same structure as that of the header tank portion 131b for the refrigerant, and includes a connection plate 132c for the heat medium coupled to the respective tubes 131a and 132a, an intermediate plate 132d for the heat medium fixed to the connection plate 132c for the heat medium, and a tank formation member 132e for the heat medium.

The intermediate plate 132d for the heat medium is fixed to the connection plate 132c for the heat medium, and is thus provided with a plurality of recesses 132f having a plurality of spaces for communicating the tubes 131a for the refrigerant in two lines with each other via the connection plate 132c for the heat medium.

Through holes are formed at parts of the intermediate plate 132d for the heat medium corresponding to the tubes 132a for the heat medium so as to penetrate the front and back sides of the plate. The tubes 132a for the heat medium are fitted into the through holes. As to the ends of the tube 131a for the refrigerant and the tube 132a for the heat medium on the header tank 132b side, the tubes 132a for the refrigerant protrude toward the tank formation member 132e for the heat medium as compared to the tube 131a for the refrigerant.

The tank formation member 132e for the heat medium is fixed to the connection plate 132c for the heat medium and the intermediate plate 132d for the heat medium to thereby form a gathering space 132g for gathering the coolants therein, and a distribution space 132h for distributing the coolants. Specifically, the tank formation member 132e for the heat medium is formed in a double mountain shape (W-like shape) as viewed from the longitudinal direction in the same way as that of the tank formation member 131e for the refrigerant.

The center part of the double mountain shape of the tank formation member 132e for the heat medium comes into contact with the intermediate plate 132d for the heat medium to partition a space into the gathering space 132g and the distribution space 132h. In this embodiment, the gathering space 132g is disposed on the upwind side in the flow direction X of the feed air, and the distribution space 132h is disposed on the downwind side thereof.

The one end side of the tank formation member 132e for the heat medium in the longitudinal direction is coupled to an inlet pipe for the heat medium (heat medium introducing portion) 13c that allows the coolant to flow into the distribution space 132h, and to an outlet pipe for the heat medium (heat medium deriving portion) 13d that allows the coolant to flow thereinto from the gathering space 132g. Further, the other end of the tank formation member 132e in the longitudinal direction is closed with a closing member.

In the thus-structured composite heat exchanger 13 of this embodiment, as indicated by the solid line in FIG. 4, the refrigerant flowing thereinto from the distribution space 131h of the header tank 131b for the refrigerant via the inlet pipe 13a for the refrigerant flows into the respective tubes 131a for the refrigerant located on the upwind side in the flow direction of the outside air among the tubes 131a for the refrigerant arranged in two lines.

The refrigerant flowing from the respective tubes 131a on the upwind side in the flow direction of the outside air flows into the respective tubes 131a for the refrigerant located on the downwind side in the flow direction of the outside air via a space formed between the intermediate plate 132d for the heat medium and the connection plate 132c for the heat medium of the header tank 132b for the heat medium.

The refrigerant flowing from the respective tubes 131a for the refrigerant positioned on the downwind side in the flow direction of the outside air are gathered or collected by the gathering space 131g of the header tank 131b for the refrigerant to be flown from the outlet pipe 13b for the refrigerant. That is, in the composite heat exchanger 13 of this embodiment, the refrigerant flowing from the inlet pipe 13a for the refrigerant flows out through the tube 131a for the refrigerant on the upwind side, the header tank 132b for the heat medium, and the tube 131a for each refrigerant located on the downwind side in that order to be turned around, and then flow out toward the refrigerant outlet pipe 13b.

Likewise, the coolant flowing into the inlet pipe 13c for the heat medium flows through the tube 132a for each heat medium on the downwind side, the header tank 131b for the refrigerant, and the tube 132a for each heat medium located on the upwind side in that order to be turned around, and then flow out toward the outlet pipe 13d for the heat medium.

In this embodiment, the use of such a composite heat exchanger 13 can exchange heat among a plurality of kinds of fluids (refrigerant, coolant, and air).

Now, an electric controller of this embodiment will be described below. The controller (not shown) of this embodiment is comprised of the known microcomputer including a CPU, an ROM, and an RAM, and a peripheral circuit thereof. The controller controls the operation of each kind of control device coupled to the output side by performing various types of computation and processing based on a control program stored in the ROM.

A group of sensors is coupled to the input side of the controller. The sensors include an inside air sensor (inside air temperature detector) for detecting a temperature of the vehicle interior, an outside air sensor (outside air temperature detector) for detecting a temperature of the outside air, a solar radiation sensor (solar radiation detector) for detecting an amount of solar radiation in the vehicle interior, and an evaporator temperature sensor (evaporator temperature detector) for detecting a temperature of blown air from the indoor evaporator 23 (evaporator temperature). And, the sensors also include a high-pressure side temperature sensor (high-pressure side refrigerant temperature detector) for detecting a temperature of high-pressure refrigerant (refrigerant discharged from the compressor 1) flowing, into the composite heat exchanger 13, a high-pressure side pressure sensor (high-pressure side refrigerant pressure detector) for detecting a pressure of the high-pressure refrigerant, and a coolant temperature sensor (heat medium temperature detector) for detecting a temperature of the coolant flowing into the composite heat exchanger 13.

An operation panel (not shown) disposed near the gauge board in front of the vehicle interior is coupled to the input side of the controller. Operation signals from various types of operating switches provided on the operation panel are input. The operating switches provided on the operation panel include an operating switch for the vehicle air conditioner, a vehicle interior temperature setting switch for setting the temperature of the vehicle interior, an operation mode setting switch, and the like.

The controller includes the combination of control units for controlling respective control devices, and is adapted to control the control devices. In this embodiment, the component (hardware and software) for controlling the operation of each control device in the controller serves as the control unit for each control device.

For example, the component for controlling the operation of the electric motor 11b of the compressor 11 serves as a discharge capacity controller, the component for controlling the operation of the coolant pump 41 and the opening/closing valve 42 of the coolant circulation circuit 40 serves as a heat medium flow rate controller, and the component for controlling the operation of the servo motor of the air mix door 35 serves as a feed air volume controller.

Next, the operation of this embodiment structured above will be described below. The air conditioner 1 for a vehicle of this embodiment can perform both the heating operation for heating the vehicle interior, and the cooling operation for cooling the vehicle interior. Which one of the heating operation and the cooling operation is to be performed is determined based on an operation signal of the operation mode setting switch of the operation panel.

(a) Cooling Operation

The cooling operation is started when a cooling operation mode is selected by the operation mode setting switch on the operation panel with the operating switch of the operation panel turned on.

In the cooling operation, the controller switches the three-way valve 21 to a refrigerant flow path for coupling the discharge port side of the compressor 11 to the second fixed throttle 22 while opening the opening/closing valve 18 of the heat pump cycle 10. Further, the controller closes the opening/closing valve 42 of the coolant circulation circuit 40.

Thus, in the heat pump cycle 10, the discharge refrigerant (high-pressure refrigerant) discharged from the compressor 11 flows as indicated by the open arrow shown in FIG. 1. In the coolant circulation circuit 40, the coolant pushed and fed by the coolant pump 41 flows as indicated by the arrow with the solid line of FIG. 1.

After switching to the refrigerant flow path and the heat medium flow path for the cooling operation via the opening/closing valve 18, the three-way valve 21, and the opening/closing valve 42, the controller reads a detection signal from the above group of sensors or an operation signal from the operation panel. Based on the detection signal or operation signal detected, a target outlet air temperature TAO, which is the target temperature of air blown into the vehicle interior, is calculated. The operation states of various kinds of control devices coupled to the output side of the controller are determined based on the calculated target outlet air temperature TAO, the detection signals from the sensor group, and the operation signals from the operation panel.

For example, a refrigerant discharge capacity of the compression mechanism 11a in the heat pump cycle 10, that is, the control signal (number of revolutions) output from the electric motor 11b of the compressor 11 is determined as follows. First, a target evaporator outlet air temperature TEO of the indoor evaporator 23 is determined based on the target outlet air temperature TAO with reference to a control map previously stored in the controller.

Based on a deviation between the target evaporator outlet air temperature TEO and the blown air temperature Te from the indoor evaporator 23 detected by the evaporator temperature sensor, the control signal to be output to the electric motor 11b of the compressor 11 is determined such that the blown air temperature Te of the air blown from the indoor evaporator 23 approaches the target outlet air temperature TEO by use of a feedback control method.

The control signal to be output to the servo motor of the air mix door 35 is determined based on the target outlet air temperature TAO and the blown air temperature Te of the indoor evaporator 23 with reference to a control map previously stored in the controller such that the temperature of air blown into the vehicle interior becomes a desired temperature set by the vehicle indoor temperature setting switch.

The control signal to be output to the electric motor of the coolant pump 41 is determined according to a detection value from the coolant temperature sensor such that the temperature of the engine EG is set in a predetermined protection temperature range.

The protection temperature range is set in a range from the lower limit protection temperature TWl set for decreasing the loss in friction due to an increase in viscosity of lubricating oil sealed in the engine EG to the upper limit protection temperature TWh set for suppressing overheat of the engine EG.

The control signals or the like determined by the target outlet air temperature TAO or the like are output to various respective control devices. Thereafter, until the stopping of the operation of the vehicle air conditioner 1 is requested by the operation panel, the following control routine is repeated every predetermined control cycle. Specifically, the control routine involves reading the above detection signal and operation signal, calculating the target outlet air temperature TAO, determining the operation state of the respective control devices, and controlling the respective control devices. Such a control routine is basically performed in the same way even when other operation modes are set.

Thus, in the heat pump cycle 10, the refrigerant discharged from the compressor 11 flows into the first heat exchanger 131 of the composite heat exchanger 13. The high-pressure refrigerant flowing into the first heat exchanger 131 of the composite heat exchanger 13 exchanges heat with the vehicle-interior feed air blown from the blower 32 to dissipate the heat therefrom, so that the vehicle-interior feed air is heated.

The high-pressure refrigerant flowing from the first heat exchanger 131 of the composite heat exchanger 13 flows into the outdoor heat exchanger 19 via the opening/closing valve 18. The refrigerant flowing into the outdoor heat exchanger 19 exchanges heat with the outside air blown from the blower fan 20 to dissipate the heat therefrom.

The refrigerant flowing from the outdoor heat exchanger 19 flows into the second fixed throttle 22, and is decompressed and expanded until it is converted into a low-pressure refrigerant. The low-pressure refrigerant decompressed by the second fixed throttle 22 flows into an indoor evaporator 23, and absorbs heat from the feed air in the vehicle interior from the blower 32 to evaporate itself. Thus, the feed air blown into the vehicle interior is cooled.

The refrigerant flowing from the indoor evaporator 23 flows into the accumulator 24, and is then separated into liquid and gas phases by the accumulator 24. The gas-phase refrigerant separated into by the accumulator 24 is sucked by the compressor 11 and compressed again.

In the coolant circulation circuit 40, the coolant pushed and fed from the coolant pump 41 flows through a coolant passage formed in the engine EG to be heated with heat generated in the engine EG. Then, the coolant flowing from the coolant passage in the engine EG flows into the radiator 43 to dissipate heat into the outside air, and then is sucked again into the coolant pump 41.

As mentioned above, in the cooling operation, the low-pressure refrigerant absorbs heat from the vehicle-interior feed air at the indoor evaporator 23, so that the feed air in the vehicle interior can be cooled to thereby cool the vehicle interior.

(b) Heating Operation

The heating operation is started when a heating operation mode is selected by the operation mode setting switch on the operation panel with the operating switch of the operation panel turned on.

In the heating operation, the controller closes the opening/closing valve 18 of the heat pump cycle 10, and switches the three-way valve 21 to the refrigerant flow path for coupling the outlet side of the outdoor heat exchanger 19 to the inlet side of the accumulator 24. Further, the controller opens the opening/closing valve 42 of the coolant circulation circuit 40.

Thus, in the heat pump cycle 10, the discharge refrigerant discharged from the compressor 11 flows as indicated by the arrow in black of FIG. 1. In the coolant circulation circuit 40, the coolant pushed and fed by the coolant pump 41 flows as indicated by the dashed arrow of FIG. 1.

Then, the controller determines the operation state of each control device coupled to the output side of the controller based on the target outlet air temperature TAO, the detection signals from the group of sensors, and the operation signal from the operation panel.

For example, the control signal (number of revolutions) to be output to the electric motor 11b of the compressor 11 is determined as follows. Specifically, the target heat exchanger temperature for the composite heat exchanger 13 is calculated based on the target outlet air temperature TAO with reference to the control map previously stored in the controller. Then, the control signal is determined based on the deviation between the calculated target heat exchanger temperature and the temperature of a high-pressure refrigerant flowing into the first heat exchanger 131 detected by the high-pressure temperature sensor by the feedback control method such that the temperature of the air blown from the composite heat exchanger 13 approaches the target heat exchanger temperature.

The control signal to be output to the servo motor of the air mix door 35 in the heating operation is determined such that an opening degree of the air mix door 35 becomes either a first target opening degree based on the target outlet air temperature TAO and the blown air temperature Te of the indoor evaporator 23, or a second target opening degree provided by decreasing an opening degree of the air passage on the composite heat exchanger 13 side as compared to the first target opening degree.

Figure 5:
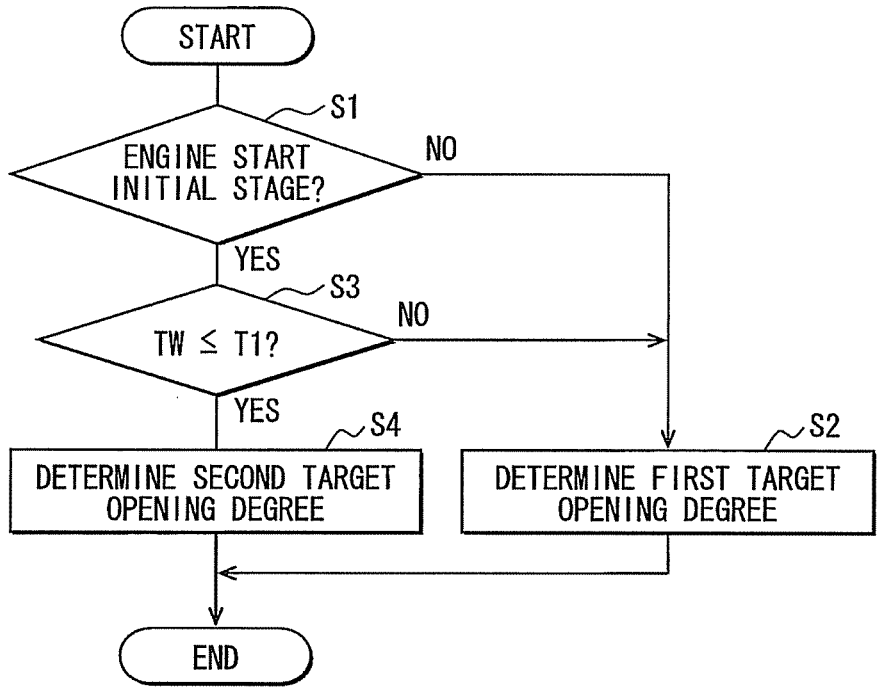
FIG. 5 is a flowchart showing a control of a servo motor of an air mix door in the first embodiment.

For example, as shown in FIG. 5, in step S1 for the controller, it is determined whether or not a predetermined reference time has elapsed since the start of the operation of the engine EG (or whether or not the air conditioner is on the initial stage of engine startup). When the air conditioner is not on the initial stage of the engine startup, that is, when the above reference time has elapsed since the engine start, the opening degree of the air mix door 35 is determined to be set to the first target opening degree in step S2. The control signal to be output to the servo motor of the air mix door 35 is determined as follows. Before the predetermined reference time has elapsed since the start of the operation of the engine EG as the external heat source device (that is, on the startup initial stage), when the temperature TW of the coolant is determined to be equal to or less than a first heat medium reference temperature T1 in step S3, the opening degree of the air mix door 35 is determined to be set to a second target opening degree in step S4. When the temperature of the coolant is determined to be higher than the first heat medium reference temperature (T1) in step S3, the opening degree of the air mix door 35 is determined to be the first target opening degree in step S2.

When the temperature of the coolant is increased to a temperature higher than the first heat medium reference temperature (T1) on the startup initial stage of the engine EG, or when the startup initial stage of the engine EG has elapsed, the control signal to be output to the servo motor of the air mix door 35 is determined such that the opening degree of the air mix door 35 becomes the first target opening degree. FIG. 5 shows a flowchart of one example of the control of the servo motor for the air mix door 35 in the controller.

When the control signal to be output to the servo motor of the air mix door 35 is determined such that the opening degree of the air mix door 35 becomes the second target opening degree, the volume of feed air blown into the composite heat exchanger 13 is decreased as compared to when the opening degree of the air mix door 35 is determined to become the first target opening degree. Conversely, when the control signal to be output to the servo motor of the air mix door 35 is determined such that the opening degree of the air mix door 35 becomes the first target opening degree, the volume of feed air blown into the composite heat exchanger 13 is increased as compared to when the opening degree of the air mix door 35 is determined to become the second target opening degree.

The control signal to be output to the electric motor 41b of the coolant pump 41 in the heating operation is determined such that the number of revolutions of the electric motor 41b becomes either the first target number of revolutions based on the detection value of the coolant temperature sensor, or the second target number of revolutions higher than the first target number of revolutions.

Figure 6:
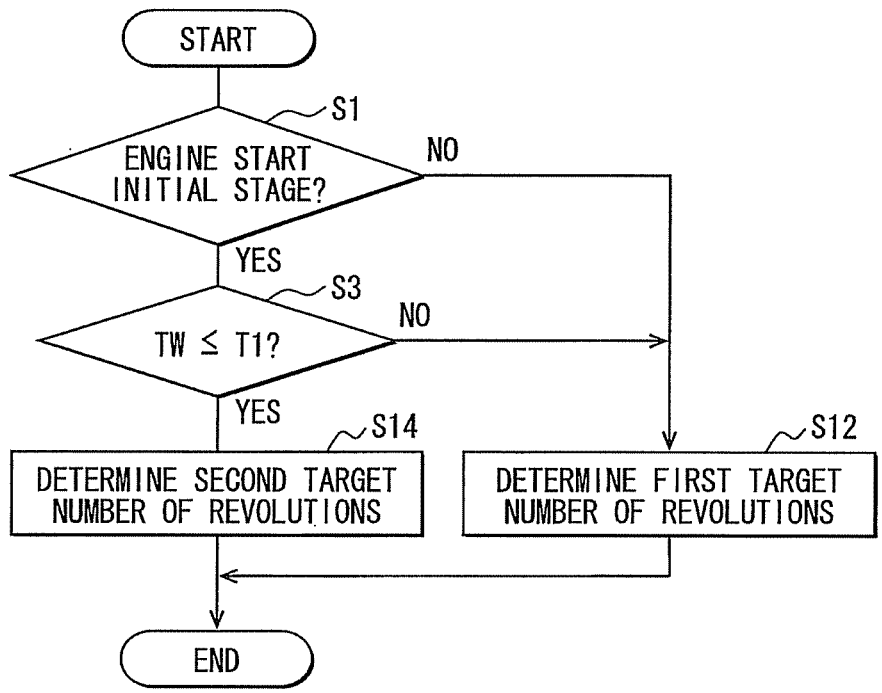
FIG. 6 is a flowchart showing a control of an electric motor of a coolant pump in the first embodiment.

For example, as shown in FIG. 6, when the condition for setting the opening degree of the air mix door 35 to the second target opening degree is satisfied, the control signal to be output to the electric motor 41b of the coolant pump 41 is determined such that the number of revolutions of the electric motor 41b becomes the second target number of revolutions.

In contrast, when the condition for setting the opening degree of the air mix door 35 to the first target opening degree is satisfied, the control signal to be output to the electric motor 41b of the coolant pump 41 is determined such that the number of revolutions of the electric motor 41b becomes the first target number of revolutions. FIG. 6 is a flowchart showing one example of the control of the electric motor 41b of the coolant pump 41 in the controller. As shown in FIG. 6, in step S1, it is determined whether or not a predetermined reference time has elapsed since the start of the operation of the engine EG (or whether or not the air conditioner is on the initial stage of engine startup). When the air conditioner is not on the initial stage of the engine startup, the number of revolutions of the electric motor 41b is determined to become the first target number of revolutions in step S12. Before the predetermined reference time has elapsed since the start of the operation of the engine EG as the external heat source device (that is, on the startup initial stage), when the temperature TW of the coolant is determined to be equal to or less than the first heat medium reference temperature T1 in step S3, the number of revolutions of the electric motor 41b is determined to become the second target number of revolutions in step S14. In contrast, when the coolant temperature TW is higher than the first heat medium reference temperature T1 in step S3, the number of revolutions of the electric motor 41b is determined to become the first target number of revolutions in step S12.

Thus, when the control signal to be output to the electric motor 41b of the coolant pump 41 is determined such that the number of revolutions of the electric motor 41b becomes the second target number of revolutions, the inflow amount of the coolant flowing into the second heat exchanger 131 of the composite heat exchanger 13 is increased as compared to when the number of revolutions of the motor is determined to become the first target number of revolutions. Conversely, when the control signal to be output to the electric motor 41b of the coolant pump 41 is determined such that the number of revolutions of the electric motor 41b becomes the first target number of revolutions, the inflow amount of coolant flowing into the second heat exchanger 131 of the composite heat exchanger 13 is decreased as compared to when the number of revolutions of the electric motor 41b is determined to become the second target number of revolutions.

In the heating operation, the controller outputs the control signal to the blower fan such that the blower fan for blowing the air to the radiator 43 is not operated.

Thus, in the heat pump cycle 10, the refrigerant discharged from the compressor 11 flows into the first heat exchanger 131 of the composite heat exchanger 13. The high-pressure refrigerant flowing into the first heat exchanger 131 of the composite heat exchanger 13 exchanges heat with the vehicle-interior feed air blown from the blower 32 to dissipate the heat. Thus, the feed air in the vehicle interior is heated.

The high-pressure refrigerant flowing from the first heat exchanger 131 of the composite heat exchanger 13 flows into the first fixed throttle 15 and is decompressed and expanded into the low-pressure refrigerant. The low-pressure refrigerant decompressed by the first fixed throttle 15 flows into the outdoor heat exchanger 19, and absorbs heat from the outside air blown from the blower fan 20 to evaporate itself. Thus, the low-pressure refrigerant exchanges heat to dissipate the heat.

The refrigerant flowing from the outdoor heat exchanger 19 flows into the accumulator 23, and is separated into gas and liquid phases by the accumulator 23. Then, the gas-phase separated by the accumulator 23 is sucked into the compressor 11, and decompressed again.

In the coolant circulation circuit 40, the coolant pushed and fed from the coolant pump 41 flows through the coolant passage formed in the engine EG to exchange heat between the engine EG and the coolant. Then, the coolant flowing from the coolant passage in the engine EG flows into both the radiator 43 and the second heat exchanger 132 of the composite heat exchanger 13.

The coolant flowing into the radiator 43 flows into the coolant pump 41 again without exchanging heat with the outside air because the blower fan is stopped. The coolant flowing into the second heat exchanger 132 of the composite heat exchanger 13 exchanges heat with one or both of the discharge refrigerant and the feed air, and is sucked into the coolant pump 41 again.

In the heating operation, when the temperature of the coolant is equal to or less than the first heat medium reference temperature on the startup initial stage of the engine EG as the external heat medium device, the volume of feed air blown into the composite heat exchanger 13 is decreased, and the inflow amount of coolant flowing into the second heat exchanger 132 is increased, which can positively promote the heat exchange between the discharge refrigerant and the coolant in the composite heat exchanger 13. When the temperature of the discharge refrigerant is higher than that of the coolant, the heat contained in the discharge refrigerant can be dissipated into the coolant via the outer fin 134 to thereby heat the coolant.

In the heating operation, when the temperature of the coolant increases up to the temperature higher than the first heat medium reference temperature on the startup initial stage of the engine EG, or when the startup initial stage of the engine EG has elapsed, the heat of the discharge refrigerant and coolant is dissipated into the vehicle-interior feed air in the composite heat exchanger 13, which can heat the feed air in the vehicle interior up to a desired temperature. Thus, the heating of the vehicle interior can be achieved.

According to this embodiment described above, the amount of heat exchanged between the discharge refrigerant and the coolant can also be changed in addition to the amount of heat exchanged between the vehicle-interior feed air and the refrigerant discharged from the compressor 11*a* in the composite heat exchanger 13, and the amount of heat exchanged between the vehicle-interior feed air and the coolant. Thus, the appropriate exchange of heat between a plurality of kinds of fluids (discharge refrigerant, coolant, and feed air) can be achieved to effectively utilize the heat of the fluids.

In this embodiment, in the heating operation, when the temperature of the coolant is equal to or less than the first heat medium reference temperature on the startup initial stage of the engine EG, the inflow amount of feed air blown into the composite heat exchanger 13 is decreased, while the inflow amount of the coolant flowing into the second heat exchanger 132 is increased, which can positively promote the heat exchange between the coolant and the discharge refrigerant in the composite heat exchanger 13.

Thus, when the temperature of the high-pressure refrigerant is higher than that of the coolant, the heat contained in the high-pressure refrigerant is dissipated into the coolant via the outer fin 134 which can heat the coolant and thus can achieve warm-up of the engine EG early on the startup initial stage of the engine EG. Thus, the friction loss of the engine EG can be reduced to thereby improve the fuel efficiency of the vehicle or the like.

In this embodiment, the outer fins 134 are bonded to the outer surfaces of the tubes 131*a* for the refrigerant of the first heat exchanger 131 and the outer surfaces of the tubes 132*a* for the refrigerant of the second heat exchanger 132, which can excessively easily transfer heat between the discharge refrigerant flowing through the first heat exchanger 131 and the coolant flowing through the second heat exchanger 132 in the composite heat exchanger 13.

(Second Embodiment)

Figure 7:
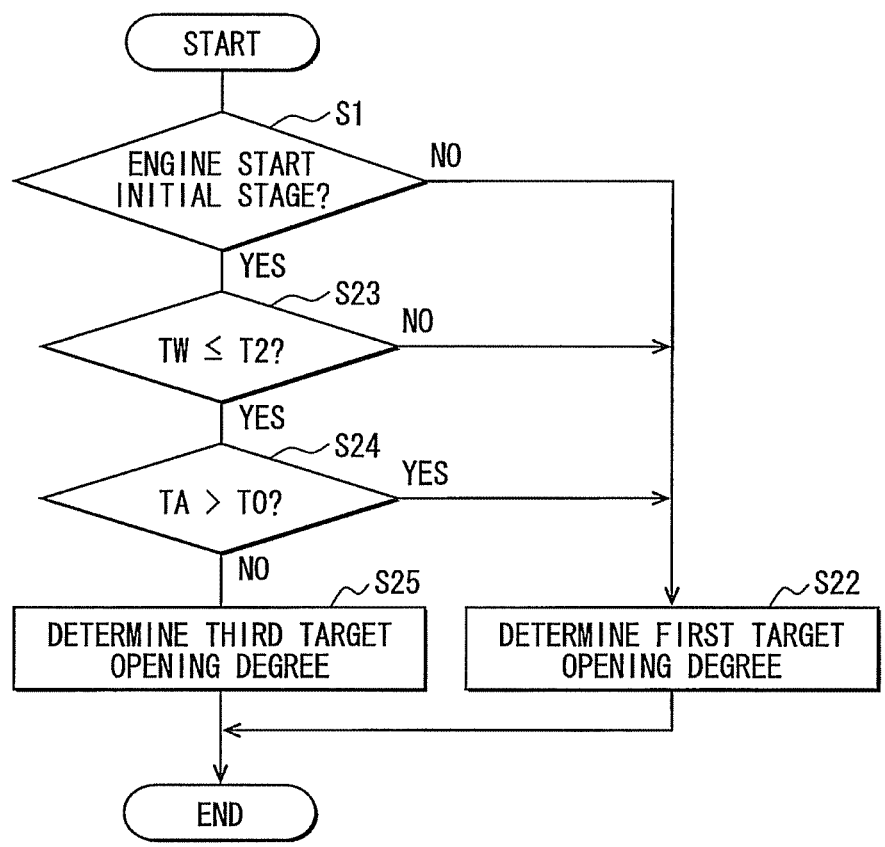
FIG. 7 is a flowchart showing a control of a servo motor of an air mix door in a second embodiment.

Next, a second embodiment of the invention will be described below based on FIG. 7. FIG. 7 shows a flowchart of the outline of the control of the servo motor of the air mix door 35 in this embodiment. In this embodiment, a description of the same or equivalent component as that of the first embodiment will be omitted or simplified below.

In the above first embodiment, when the temperature of the coolant flowing into the second heat exchanger 132 of the composite heat exchanger 13 is equal to or less than the first heat medium reference temperature on the startup initial stage of the engine EG, the volume of feed air blown into the composite heat exchanger 13 is decreased by adjusting the opening degree of the air mix door 35.

In contrast, in this embodiment, when the temperature TW of the coolant flowing into the second heat changer 132 of the composite heat exchanger 13 is equal to or less than the predetermined second heat medium reference temperature T2, the volume of feed air blown into the composite heat exchanger 13 is increased by adjustment of the opening degree of the air mix door 35. Then, when the temperature TA of the blown air passing through the composite heat exchanger 13 is increased to a temperature higher than the blown air reference temperature T0, the volume of feed air blown into the composite heat exchanger 13 is gradually decreased by adjustment of the opening degree of the air mix door 35. The second heat medium reference temperature is not limited to the same value as the first heat medium reference temperature in the above embodiment, and can be set to a temperature different from the first heat medium reference temperature.

Specifically, the control signal to be output to the servo motor of the air mix door 35 in the heating operation of this embodiment is determined such that the opening degree of the air mix door 35 is set to either the first target opening degree based on the target outlet air temperature TAO and the blown air temperature Te of the indoor evaporator 23, or the third target opening degree provided by increasing the opening degree of an air passage on the composite heat exchanger 13 side as compared to the first target opening degree.

For example, as shown in FIG. 7, when the engine startup initial stage is determined to have elapsed in step S1 for the controller, the opening degree of the air mix door 35 is set to the first target opening degree based on the target outlet air temperature TAO and the blown air temperature Te of the indoor evaporator 23. Before the predetermined reference time has elapsed since the start of the operation of the engine EG as the external heat source device (that is, on the startup initial stage), when the temperature TW of the coolant is determined to be higher than the second heat medium reference temperature T2 in step S23, the control signal to be output to the servo motor of the air mix door 35 is determined such that the opening degree of the air mix door 35 becomes the first target opening degree in step S22. When the temperature of the coolant is determined to be equal to or less than the second heat medium reference temperature T2 in step S23, it is determined whether or not the temperature TA of the blown air passing through the composite heat exchanger 13 is higher than the blown air reference temperature T0 in step S24. When the temperature TA of the blown air passing through the composite heat exchanger 13 is determined to be higher than the blown air reference temperature T0 in step S24, the opening degree of the air mix door 35 is determined to be set to the first target opening degree in step S22. When the temperature TA of the blown air passing through the composite heat exchanger 13 is determined to be equal to or less than the blown air reference temperature T0 in step S24, the opening degree of the air mix door 35 is determined to be set to the third target opening degree. On the startup initial stage of the engine EG, when the coolant temperature TW is equal to or less than the second heat medium reference temperature T2, the control signal to be output to the servo motor of the air mix door 35 may be determined such that the opening degree of the air mix door 35 becomes the third target opening degree.

When the coolant temperature TW is increased to a temperature higher than the second heat medium reference temperature T2 on the startup initial stage of the engine EG, or when the startup initial stage of the engine EG has elapsed, the control signal to be output to the servo motor of the air mix door 35 is determined such that the opening degree of the air mix door 35 becomes the first target opening degree.

When the temperature TA of the blown air passing through the composite heat exchanger 13 is increased up to a temperature higher than the blown air reference temperature T0, the control signal to be output to the servo motor of the air mix door 35 is determined such that the opening degree of the air mix door 35 becomes the first target opening degree. FIG. 7 is an exemplary diagram for explaining the flow of the process for determining the target opening degree of the air mix door 35.

Thus, when the control signal to be output to the servo motor of the air mix door 35 is determined such that the opening degree of the air mix door 35 becomes the third target opening degree, the volume of the vehicle-interior feed air blown into the composite heat exchanger 13 is decreased as compared to when the opening degree of the door is determined to become the first target opening degree. Conversely, when the control signal to be output to the servo motor of the air mix door 35 is determined such that the opening degree of the air mix door 35 becomes the first target opening degree, the volume of the vehicle-interior feed air blown into the composite heat exchanger 13 is decreased as compared to when the opening degree of the door is determined to become the third target opening degree.

As mentioned above, in this embodiment, in the heating operation on the startup initial stage of the engine EG, when the temperature TW of the coolant flowing into the second heat exchanger 132 of the composite heat exchanger 13 is equal to or less than the second heat medium reference temperature 12, the volume of feed air blown into the composite heat exchanger 13 can be increased to positively promote the heat exchange between the feed air in the composite heat exchanger 13 and the discharge refrigerant and coolant.

Thus, the heat included in the discharge refrigerant is dissipated into the feed air in the vehicle interior, so that the feed air in the vehicle interior can be heated, which can heat the vehicle interior early on the startup initial stage of the engine EG.

In this embodiment, when the temperature of the blown air passing through the composite heat exchanger 13 is increased up to a temperature higher than the blown air reference temperature, the volume of the feed air blown into the composite heat exchanger 13 can be decreased to positively promote the heat exchange between the coolant and the discharge refrigerant in the composite heat exchanger 13.

Thus, when the temperature of the high-pressure refrigerant is higher than that of the coolant, the heat contained in the high-pressure refrigerant is dissipated into the coolant via the outer fins 134, so that the coolant can be heated to perform the warm-up of the engine EG.

In this embodiment, when the volume of the feed air blown into the composite heat exchanger 13 is decreased according to the coolant temperature TW and the blown, air temperature TA, the control signal output to the electric motor 41b of the coolant pump 41 may be determined so as to increase the inflow amount of the coolant flowing into the second heat exchanger 131 of the composite heat exchanger 13. Thus, the heat exchange between the feed air and the discharge refrigerant and coolant in the composite heat exchanger 13 can be positively promoted.

(Third Embodiment)

Figure 8:
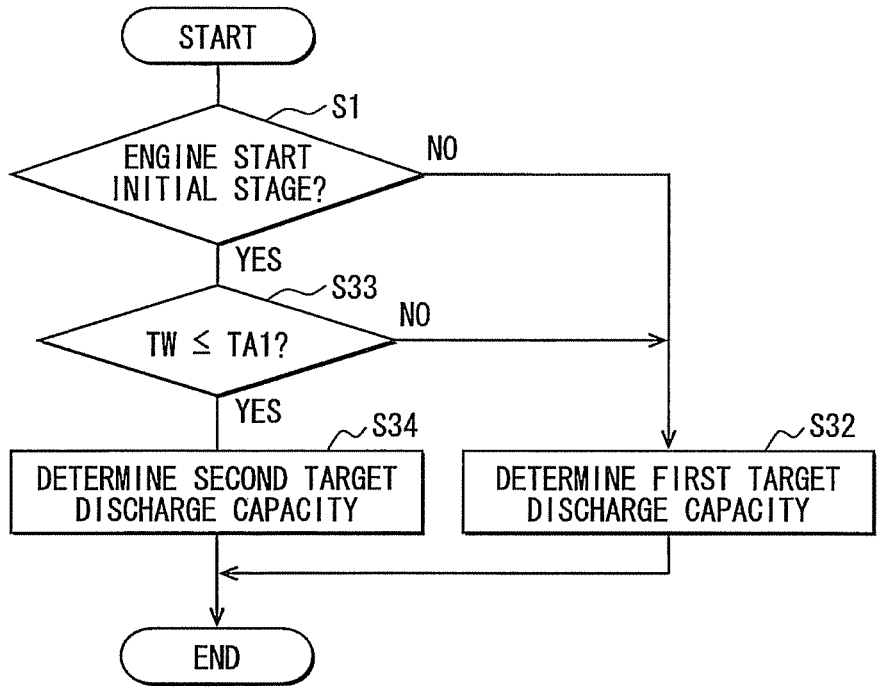
FIG. 8 is a flowchart showing a control of an electric motor of a compressor in a third embodiment.

Next, a third embodiment of the present disclosure will be described below based on FIG. 8. FIG. 8 is a flowchart showing the outline of the control of the electric motor 11b of the compressor 11 in this embodiment. In this embodiment, the description of the same or equivalent part as that of the first or second embodiment will be omitted or simplified below.

In each of the above embodiments, for example, in the heating operation, the control signal to be output to the electric motor 11b of the compressor 11 is determined according to a target heat exchanger temperature calculated based on the target outlet air temperature TAO.

In contrast, in this embodiment, when the temperature TW of the coolant flowing into the second heat exchanger 132 of the composite heat exchanger 13 is higher than an air temperature TA1 of the air blown toward the composite heat exchanger 13, a refrigerant discharge capacity of the compression mechanism 11a is changed such that the temperature of blown air passing through the composite heat exchanger 13 becomes a target heat exchanger temperature calculated based on the target outlet air temperature TAO.

In introducing the outside air into the casing 31 via the inside/outside air switching device 33, the temperature of feed air blown toward the composite heat exchanger 13 becomes a detection value (outside air temperature) of the outside air sensor. In introducing the inside air into the casing 31, the temperature of feed air becomes a detection value (inside air temperature) from the inside air sensor.

Specifically, the control signal output to the electric motor 11b of the compressor 11 is determined to set either the first target number of revolutions (first target discharge capacity) according to the target heat exchanger temperature calculated based on the target air outlet temperature or the second target number of revolutions (second target discharge capacity) higher than the first target number of revolutions.

For example, as shown in FIG. 8, when the engine startup initial stage is determined to have elapsed in step S1 for the controller, the control signal to be output to the electric motor 11b of the compressor 11 is determined to take the first target number of revolutions corresponding to the target heat exchanger temperature calculated based on the target outlet air temperature in S32, and the discharge capacity of the compressor 11 is controlled to the first target discharge capacity. On the engine startup initial stage, when the coolant temperature TW is determined to be higher than the temperature TA1 of feed air (feed air inflow temperature) blown toward the composite heat exchanger 13 in step S33, the control signal to be output to the electric motor 11b of the compressor 11 is determined to be a signal corresponding to the first target number of revolutions. In contrast, when the coolant temperature TW is determined to be equal to or less than the feed air inflow temperature TA1 in step S33, the control signal to be output to the electric motor 11b of the compressor 11 is determined to be a signal corresponding to the second target number of revolutions in step S34.

When the temperature TW of the coolant flowing into the second heat exchanger 132 of the composite heat exchanger 13 is higher than the temperature TA1 of the feed air blown toward the composite heat changer 13, the control signal to be output to the electric motor 11b of the compressor 11 is determined such that the number of revolutions of the electric motor 11b of the compressor 11 becomes the first target number of revolutions (first target discharge capacity).

In contrast, when the temperature TW of the coolant flowing into the second heat exchanger 132 of the composite heat exchanger 13 is equal to or less than the temperature TA1 of the feed air blown toward the composite heat exchanger 13, the control signal is determined such that the number of revolutions of the electric motor 11b of the compressor 11 becomes the second target number of revolutions (second target discharge capacity).

Thus, when the control signal to be output to the electric motor 11b of the compressor 11 is determined such that the number of revolutions of the elector motor 11b becomes the first target number of revolutions, the heat contained in the discharge refrigerant flowing through the first heat exchanger 131 of the composite heat exchanger 13 can be dissipated into the vehicle-interior feed air to thereby heat the feed air in the vehicle interior. Further, the heat contained in the coolant flowing through the second heat exchanger 132 can be dissipated into the feed air in the vehicle interior to thereby heat the feed air in the vehicle interior. That is, the heat contained in the discharge refrigerant, and the heat contained in the coolant can be effectively utilized so as to heat the vehicle-interior feed air.

When the control signal to be output to the electric motor 11b of the compressor 11 is determined such that the number of revolutions of the electric motor 11b becomes the second target number of revolutions, the heat contained in the discharge refrigerant flowing through the first heat exchanger 131 of the composite heat exchanger 13 can be dissipated into the feed air in the vehicle interior to thereby heat the vehicle-interior feed air. Further, the heat contained in the discharge refrigerant flowing through the first heat exchanger 131 of the composite heat exchanger 13 can be dissipated into the coolant flowing through the second heat exchanger 132 to thereby heat the coolant. That is, the heat contained in the discharge refrigerant can be effectively utilized so as to heat the vehicle-interior feed air and the coolant.

(Fourth Embodiment)

Figure 9:
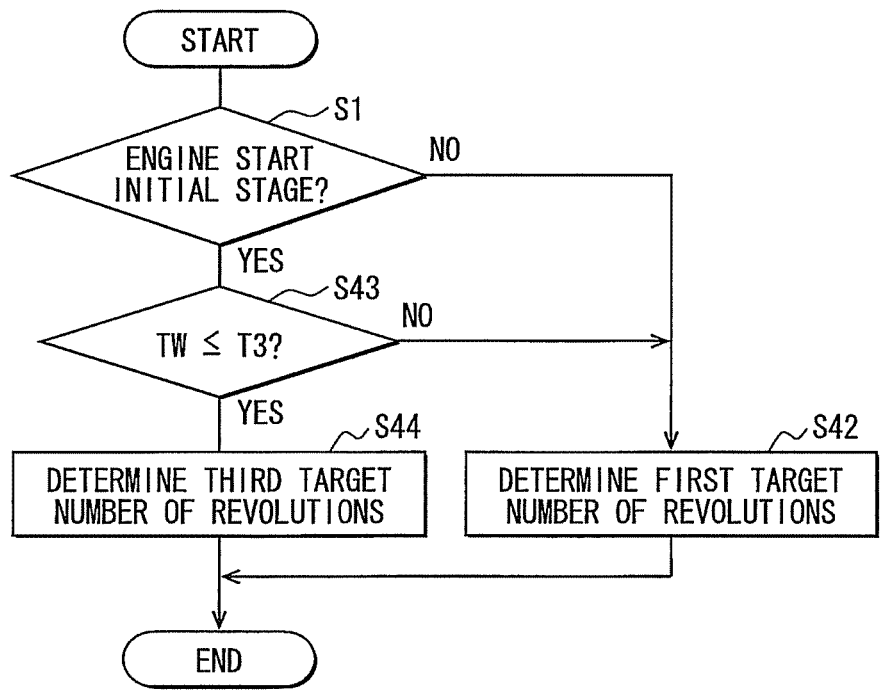
FIG. 9 is a flowchart showing a control of an electric motor of a coolant pump in a fourth embodiment.

Next, a fourth embodiment of the invention will be described below based on FIG. 9. FIG. 9 shows a flowchart of the outline of the control of the electric motor 11b in the compressor 11 of this embodiment. In this embodiment, the description of the same or equivalent part as that of any one of the first to third embodiments will be omitted or simplified below.

In this embodiment, when the temperature TW of the coolant flowing into the second heat exchanger 132 of the composite heat exchanger 13 is equal to or less than the predetermined third heat medium reference temperature 13, a refrigerant discharge capacity of the compression mechanism 11a is changed such that the temperature of blown air passing through, the composite heat exchanger 13 becomes the target heat exchanger temperature calculated based on the target outlet air temperature TAO. And, at the same time, the inflow amount of the coolant flowing into the second heat exchanger 131 of the composite heat exchanger 13 is decreased. The third heat medium reference temperature T3 is not limited to the same value as each of the first and second heat medium reference temperatures T1 and T2 in the above embodiments, but can be set to a value different from the first and second heat medium reference temperatures T1 and T2.

Specifically, the control signal to be output to the electric motor 11b of the compressor 11 is determined to take the target number of revolutions corresponding to the target heat exchanger temperature calculated based on the target outlet air temperature.

The control signal output to the electric motor 41b of the coolant pump 41 is determined such that the number of revolutions of the electric motor 41b becomes either the first target number of revolutions corresponding to the detection value from the coolant temperature sensor, or the third target number of revolutions lower than the first target number of revolutions.

For example, as shown in FIG. 9, when the engine startup initial stage is determined to have elapsed in step S1 for the controller, the number of revolutions of the electric motor 41b is determined to become the first target number of revolutions in step S42. When the air conditioner is determined to be presently on the engine startup initial stage in step S1 for the controller, the determination in step S43 is performed. When the temperature 1W of the coolant flowing into the second heat exchanger 132 is determined to be equal to or less than the third heat medium reference temperature T3 in step S43, the number of revolutions of the electric motor 41b of the coolant pump 41 is determined to become the third target number of revolutions in step S44. When the temperature TW of the coolant flowing into the second heat exchanger 132 is higher than the third heat medium reference temperature T3 in step S43, the number of revolutions of the electric motor 41b is determined to become the first target number of revolutions in step S42.

When the temperature TW of the coolant flowing into the second heat exchanger 132 of the composite heat exchanger 13 is equal to or less than the third heat medium reference temperature T3, the inflow amount of the coolant flowing into the second heat exchanger 132 is decreased, and the refrigerant discharge capacity of the compression mechanism 11 is adjusted according to the target outlet air temperature. Thus, the heat exchange between the discharge refrigerant and the feed air can be positively promoted by the composite heat exchanger 13 to adjust the air blown into the vehicle interior to a desired temperature.

In this embodiment, when the temperature TW of the coolant flowing into the second heat exchanger 132 is equal to or less than the third heat medium reference temperature T3, the control signal to be output to the electric motor 41b of the coolant pump 41 is determined such that the inflow amount of the coolant flowing into the second heat exchanger 132 is decreased. However, the invention is not limited to thereto. For example, when the temperature of the coolant flowing into the second heat exchanger 132 is equal to or less than the third heat medium reference temperature, the opening/closing valve 42 of the coolant circulation circuit 40 may be closed to thereby decrease the inflow amount of the coolant flowing into the second heat exchanger 132.

(Other Embodiments)

The embodiments of the present disclosure have been described above, but the present disclosure is not limited thereto. It should be understood that the disclosed embodiments are not limited to the terms as used in the claims and can cover the range that can be easily changed reasonably by those skilled in the art, and that various modifications and changes can be made to the embodiments based on the general knowledge of those skilled in the art without departing from the spirit and scope of the claims. For example, the following modifications can be made.

(1) Similarly to the heat pump cycle 10 described in the above respective embodiments, in a refrigeration cycle device for exchanging heat between refrigerant and outside air in the outdoor heat exchanger 19 in the heating operation to thereby evaporate the refrigerant, frost may be formed in the outdoor heat exchanger 19 when the refrigerant evaporation temperature of the outdoor heat exchanger 19 is equal to or less than a frost formation temperature (specifically, 0° C.). The frost formation closes an outside air passage for allowing the outside air to flow through the outdoor heat exchanger 19, which would result in a decrease in heat exchange capacity of the outdoor heat exchanger 19.

Accordingly, for example, the inflow amount of the discharge refrigerant from the compressor 11 into the first heat exchanger 131 of the composite heat exchanger 13 is restricted, whereby the temperature of the refrigerant flowing through the outdoor heat exchanger 19 is set to be equal to or more than the frost formation temperature.

Similarly to the composite heat exchanger 13 described in the above embodiments, the outdoor heat exchanger 19 is configured by not only the heat exchanging portion for exchanging the heat between the refrigerant and outside air, but also a heat exchanging portion for exchanging the heat between at least one of the outside air and the refrigerant and a heat medium for cooling another heat source device (vehicle-mounted battery or the like) other than the engine EG. Thus, the inflow amount of the refrigerant flowing into the outdoor heat exchanger 19 is restricted, while increasing the inflow amount of the heat medium of another heat source device into the outdoor heat exchanger 19, so that the temperature of the outdoor heat exchanger 19 is equal to or more than the frost formation temperature.

In defrosting of the outdoor heat exchanger 19 in any case, the refrigerant discharge capacity of the compression mechanism 11a of the compressor 11 is restricted, whereby the refrigerant with the desired amount of heat cannot flow through the first heat exchanger 131 of the composite heat exchanger 13. In this case, another heating source, such as an electric heater, is provided for adjusting the temperature of the feed air in the vehicle interior, which would increase costs due to an increase in number of parts of the air conditioner for the vehicle.

In the air conditioner for a vehicle of this embodiment, when the refrigerant discharge capacity of the compression mechanism 11a into the outdoor heat exchanger 19 is restricted, for example, at the time of defrosting, the inflow amount of the coolant into the second heat exchanger 132 is increased. Thus, the amount of heat exchanged between the feed air and the coolant in the composite heat exchanger 13 can be increased to thereby positively promote the heat exchange between the feed air and the coolant in the exchanger 13, which can adjust the temperature of the air blown into the vehicle interior. That is, the heat contained in the coolant can be effectively used to heat the feed air blown into the vehicle interior.

The control for increasing the inflow amount of the coolant into the second heat exchanger 132 of the composite heat exchanger 13 can be performed not only at the time of the defrosting of the outdoor heat exchanger 19, but also at the time when the refrigerant with the desired amount of heat cannot flow through the first heat exchanger 131 of the heat exchanger 13.

(2) Although in the above respective embodiments, the engine EG has been explained as the external heat source device by way of example, the external heat source device is not limited to the engine EG. For example, an electric motor for traveling or a vehicle-mounted battery that generates heat in operation may be used as the external heat source device.

For example, when the vehicle-mounted battery is used as the external heat source device, the vehicle-mounted battery generates heat in charging. The heat generated in charging the vehicle-mounted battery may increase the temperature of the heat medium flowing into the second heat exchanger 132 of the composite heat exchanger 13, which may increase the inflow amount of the heat medium whose temperature is increased, into the second heat exchanger 132 of the composite heat exchanger 13. In this case, the heat generated upon charging the vehicle-mounted battery can be effectively used to adjust the temperature of the feed air.

(3) In the above respective embodiments, the control signal for each control device on the startup initial stage of the engine EG is determined according to the temperature of the coolant or the like. However, the above-mentioned determination of the control signal may be performed not only on the startup initial stage of the engine EG, but also after the startup initial stage of the engine EG has elapsed.

(4) In the above first embodiment, when the temperature of the coolant on the startup initial stage of the engine EG as the external heat source device in the heating operation is equal to or less than the first heat medium reference temperature, the volume of feed air in the vehicle interior blown into the composite heat exchanger 13 is decreased, while increasing the inflow amount of the coolant into the second heat exchanger 132 of the heat exchanger 13, by way of example. However, the invention is not limited thereto.

For example, when the coolant temperature on the startup initial stage of the engine EG is lower than the first heat medium reference temperature even in the cooling operation, the volume of the vehicle-interior feed air into the composite heat exchanger 13 may be decreased, while the inflow amount of the coolant into the second heat exchanger 132 of the composite heat exchanger 13 may be increased by opening the opening/closing valve 42 of the coolant circulation circuit 40.

When the coolant temperature on the startup initial stage of the engine EG is lower than the first heat medium reference temperature, the volume of the vehicle-interior feed air blown toward at least the composite heat exchanger 13 may be decreased. Thus, the heat exchange between the coolant and the discharge refrigerant in the composite heat exchanger 13 can be positively promoted.

In addition to the startup initial stage of the engine EG as the external heat source device, when the coolant temperature is equal to or less than the first heat medium reference temperature, the volume of the vehicle-interior feed air into at least the composite heat exchanger 13 may be decreased.

(5) In the description of the above respective embodiments, the air mix door 35 serves as the feed air volume adjustment portion by way of example. Alternatively, the feed air volume adjustment portion may be comprised of the electric motor 32b of the blower 32.

(6) In the above respective embodiments, the tubes 131a for the refrigerant and the tubes 132a for the heat medium are alternatively arranged over the composite heat exchanger 13. However, the invention is not limited thereto, and the tubes 131a for the refrigerant and the tubes 132a for the heat medium are alternatively arranged over a part of the composite heat exchanger 13. At least one tube among one of both groups of the tubes 131a for the refrigerant and the tubes 132a for the heat medium may be disposed between other tubes of the other group.

(7) In the above respective embodiments, either the tubes 131a or the tubes 132a in the composite heat exchanger 13 each are arranged in two lines in the air flow direction. However, the invention is not limited thereto, and these tubes may be arranged in more than two lines.

(8) In the above respective embodiments, a normal chlorofluorocarbon-based refrigerant is used as the refrigerant by way of example, but the kind of the refrigerant is not limited thereto. For example, natural refrigerant, such as carbon dioxide, or a hydrocarbon refrigerant and the like may be used.

(9) The air conditioners for the vehicle described in the above respective embodiments can be used in combination as much as possible.

Further, in the embodiments shown in FIGS. 5 to 9, a part of the determination step, such as step S1, may be omitted. The determination steps shown in FIGS. 5 to 9 may be used in combination as much as possible. In the above embodiments and modified examples thereof, the following technical forms and features may be employed.

According to an aspect of the present disclosure, an air conditioner for a vehicle includes: a blower which blows air into a vehicle interior; a casing forming an air passage through which feed air blown by the blower flows; a composite heat exchanger disposed in the casing, the composite heat exchanger including a first heat exchanger configured to exchange heat between the feed air and a discharge refrigerant discharged from a compression mechanism for compressing a refrigerant in a refrigeration cycle, and a second heat exchanger configured to exchange heat between the feed air and a heat medium for adjusting a temperature of an external heat source device that generates heat in operation; a feed air volume adjustment portion disposed to adjust a volume of the feed air blown into the composite heat exchanger; a discharge capacity changing portion configured to change a refrigerant discharge capacity, of the compression mechanism; a heat medium pressure-feed portion which pressure-feeds the heat medium; and a heat medium flow-rate adjustment portion which adjusts an inflow amount of the heat medium flowing into the second heat exchanger. Furthermore, the composite heat exchanger includes an integrated combination structure of the first heat exchanger and the second heat exchanger so as to enable heat transfer between the discharge refrigerant flowing through the first heat exchanger and the heat medium flowing through the second heat exchanger. In addition, the composite heat exchanger is configured to change an amount of the heat exchanged among the feed air, the discharge refrigerant and the heat medium in the composite heat exchanger by adjusting at least one of the volume of the feed air, the refrigerant discharge capacity of the compression mechanism, and the inflow amount of the heat medium.

Thus, it is possible to adjust not only the amount of the heat exchange between the feed air in the composite heat exchanger and the refrigerant discharged from the compression mechanism and the amount of the heat exchange between the feed air and the heat medium, but also the amount of the heat exchange between the discharge refrigerant and the heat medium, thereby achieving the appropriate heat exchange between plural kinds of fluids to effectively use the heat contains in each of the fluids.

For example, the first heat exchanger may include a plurality of refrigerant tubes through which the discharge refrigerant flows, and the second heat exchanger includes a plurality of heat medium tubes through which the heat medium flows. The feed air passages for allowing the feed air to flow therethrough are formed at the outer surfaces of the refrigerant tubes and the heat medium tubes. At least one tube among one of both groups of the refrigerant tubes and the heat medium tubes may be disposed between other tubes of the other group, and the refrigerant tubes and the heat medium tubes may be arranged spaced apart from each other. And the feed air passage may be formed between the refrigerant tube and the heat medium tube adjacent each other.

The feed air passage for allowing the feed air to flow through between the tubes for the refrigerant and the tubes for the heat medium is formed, which can specifically and easily achieve the composite heat exchanger that can exchange the heat, between the feed air and each of the discharge refrigerant and the heat medium.

Outer fins may be bonded to the outer surfaces of the tubes for the refrigerant and the outer surfaces of the tubes for the heat medium. The outer fin is adapted to promote the heat exchange between heat exchanging portions of both tubes, while enabling the heat transfer between the discharge refrigerant flowing through the tubes for the refrigerant and the heat medium flowing through the tubes for the heat medium.

Thus, the outer fins are bonded to the outer surfaces of the tubes for the refrigerant and the outer surfaces of the tubes for the heat medium, which can extremely easily provide the heat transfer between the discharge refrigerant flowing through the first heat exchanger and the heat medium flowing through the second heat exchanger.

When the temperature of the heat medium is equal to or less than the predetermined first heat medium reference temperature, the feed air volume adjustment portion may decrease the volume of feed air. Thus, when the temperature of the heat medium flowing into the second heat exchanger of the composite heat exchanger is equal to or less than the first heat medium reference temperature, the volume of the feed air blown into the composite heat exchanger is decreased to thereby decrease the amount of heat exchanged between the feed air and the heat medium and discharge refrigerant. As a result, the heat exchange between the discharge refrigerant and the heat medium in the composite heat exchanger can be positively promoted.

For example, when the temperature of the heat medium is equal to or less than the first heat medium reference temperature before the predetermine reference time has elapsed since the start of the operation of the external heat source device, the volume of the feed air is decreased. And when the temperature of the heat medium is increased to a temperature higher than the first heat medium reference temperature, the volume of the feed air may be increased.

Thus, when the temperature of the heat medium is equal to or less than the first heat medium reference temperature on the initial stage of the operation start of the external heat source device, the heat exchange between the discharge refrigerant and the heat medium in the composite heat exchanger can be positively promoted. Further, when the temperature of the heat medium is increased up to a temperature higher than the first heat medium reference temperature, the heat exchange between the feed air and the discharge refrigerant and heat medium can be appropriately performed in the composite heat exchanger.

In this case, when the temperature of the heat medium is low on the initial stage of the operation start of the external heat source device, the heat exchange between the discharge refrigerant and the heat medium in the composite heat exchanger is given higher priority than the heat exchange between the discharge refrigerant and the feed air.

When the temperature of the heat medium is equal to or less than the predetermined second heat medium reference temperature before the predetermined reference time has elapsed since the start of the operation of the external heat source device, the feed air volume adjustment portion may increase the volume of the feed air. When the temperature of the blown air passing through the composite heat exchanger is increased to a temperature higher than the predetermined blown air reference temperature, the feed air volume adjustment portion may decrease the volume of the feed air.

Thus, when the temperature of the heat medium on the initial stage of the operation start of the external heat source device is equal to or less than the second heat medium reference temperature, the heat exchange between the feed air and each of the discharge refrigerant and the heat medium in the composite heat exchanger can be positively promoted. Further, when the temperature of blown air passing through the composite heat exchanger is increased to a temperature higher than the blown air reference temperature, the heat exchange between the discharge refrigerant and the heat medium can be appropriately performed in the composite heat exchanger.

In this case, when the temperature of the heat medium is low on the initial stage of the operation start of the external heat source device, the heat exchange between the feed air and each of the discharge refrigerant and heat medium in the composite heat exchanger is given higher priority than the heat exchange between the discharge refrigerant and the heat medium.

The heat medium flow rate adjustment portion may increase the inflow amount of the heat medium when the volume of the feed air is decreased by the feed air volume adjustment portion according to the temperature of the heat medium.

When the volume of feed air blown into the composite heat exchanger is decreased according to the temperature of the heat medium flowing into the second heat exchanger of the composite heat exchanger, the inflow amount of the heat medium flowing into the second heat exchanger is increased to thereby increase the amount of heat exchanged between the discharge refrigerant and the heat medium. As a result, the heat exchange between the discharge refrigerant and the heat medium in the composite heat exchanger can be more positively promoted.

Specifically, the bypass passage may be formed inside the casing to allow the feed air blown from the blower to bypass the composite heat exchanger, and the feed air volume adjustment portion may be comprised of the air mix door for changing the rate of the volume of the feed air flowing into the composite heat exchanger to that of the feed air flowing into the bypass passage.

When the temperature of the heat medium becomes equal to or more than that of the feed air blown by the blower toward the composite heat exchanger, the discharge capacity changing portion may change the refrigerant discharge capacity of the compression mechanism such that the temperature of the blown air passing through the composite heat exchanger approaches the predetermined target temperature.

Thus, when the temperature of the heat medium flowing into the second heat exchanger of the composite heat exchanger is equal to or higher than that of the feed air blown toward the composite heat exchanger, the refrigerant discharge capacity of the compression mechanism can be adjusted according to the target temperature. As a result, the heat exchange can be appropriately performed between the discharge refrigerant and the feed air in the first heat exchanger, while the heat exchange can also be appropriately performed between the heat medium and the feed air in the second heat exchanger. That is, the heat contained in the discharge refrigerant and the heat medium can be effectively utilized to heat the feed air blown into the vehicle interior.

When the temperature of the heat medium is equal to or less than the predetermined third heat medium reference temperature, the discharge capacity changing portion changes the refrigerant discharge capacity of the compression mechanism such that the temperature of blown air passing through the composite heat exchanger approaches the predetermined target temperature. The heat medium flow rate adjustment portion may decrease the inflow amount of the heat medium when the temperature of the heat medium is equal to or less than the third heat medium reference temperature.

Thus, the heat exchange between the discharge refrigerant and the feed air in the composite heat exchanger can be positively promoted to thereby adjust the air blown into the vehicle interior to the desired temperature.

The heat medium flow rate adjustment portion may increase the inflow amount of the heat medium when the adjustment of the refrigerant discharge capacity of the compression mechanism is restricted by the discharge capacity changing portion.

Thus, the heat exchange between the heat medium and the feed air in the composite heat exchanger can be promoted to thereby adjust the temperature of air blown into the vehicle interior. That is, when the feed air cannot be heated sufficiently with the heat contained in the discharge refrigerant, the heat contained in the heat medium is dissipated into the feed air to be blown into the vehicle interior, so that the heat contained in the heat medium can be effectively utilized.

For example, the external heat source device may be a vehicle-mounted battery that generates heat upon charging. In this case, upon charging the vehicle-mounted battery, the heat medium flow rate adjustment portion may increase the inflow amount of the heat medium. Thus, the heat generated upon charging the vehicle-mounted battery can be effectively used to adjust the temperature of the feed air.

Specifically, a tank for the refrigerant that gathers or distributes the refrigerants flowing through the tubes for the refrigerant in the first heat exchanger is fixed to both the tubes for the refrigerant and the tubes for the heat medium on the one end side in the longitudinal direction of each of the tube for the refrigerant and the tube for the heat medium. Further, another tank for the heat medium that gathers or distributes the heat media flowing through the tubes for the heat medium in the second heat exchanger is fixed to both the tubes for the refrigerant and the tubes for the heat medium on the other end side in the longitudinal direction of each of the tube for the refrigerant and the tube for the heat medium.

The tubes for the refrigerant and the tubes for the heat medium may be arranged in lines in the flow direction of the feed air flowing through the feed air passage.

A refrigerant introducing portion and a refrigerant deriving portion for introducing the refrigerant may be coupled to one end side of the tank for the refrigerant in the longitudinal direction. A heat medium introducing portion and a heat medium deriving portion for introducing the heat medium may be coupled to one end side of the tank for the heat medium in the longitudinal direction.

The term "decreasing the volume of feed air" as used herein means not only the way to change the volume of feed air to a smaller level than that of the feed air presently blown into the composite heat exchanger, but also the way to set the volume of feed air to zero.

The term "decreasing the inflow amount of the heat medium" means not only the way to change the inflow amount of the heat medium to a smaller level than that of the heat medium flowing into the second heat exchanger of the composite heat exchanger, but also the way to set the inflow amount of the heat medium to zero.

What is claimed is:

1. An air conditioner for a vehicle, comprising: a blower which blows air into a vehicle interior; a casing forming an air passage through which feed air blown by the blower flows; a composite heat exchanger disposed in the casing, the composite heat exchanger including a first heat exchanger configured to exchange heat between the feed air and a discharge refrigerant discharged from a compression mechanism for compressing a refrigerant in a refrigeration cycle, and a second heat exchanger configured to exchange heat between the feed air and a heat medium for adjusting a temperature of an external heat source device that generates heat in operation; a feed air volume adjustment portion disposed to adjust a volume of the feed air blown into the composite heat exchanger; a discharge capacity changing portion configured to change a refrigerant discharge capacity of the compression mechanism; a heat medium pressure-feed portion which pressure-feeds the heat medium; and a heat medium flow-rate adjustment portion which adjusts an inflow amount of the heat medium flowing into the second heat exchanger, wherein the composite heat exchanger includes an integrated combination structure of the first heat exchanger and the second heat exchanger so as to enable heat transfer between the discharge refrigerant flowing through the first heat exchanger and the heat medium flowing through the second heat exchanger, the composite heat exchanger is configured to change an amount of the heat exchanged among the feed air, the discharge refrigerant and the heat medium in the composite heat exchanger by adjusting at least one of the volume of the feed air, the refrigerant discharge capacity of the compression mechanism, and the inflow amount of the heat medium; the first heat exchanger includes a plurality of refrigerant tubes through which the discharge refrigerant flows, the second heat exchanger includes a plurality of heat medium tubes through which the heat medium flows, a feed air passage through which the feed air flows is provided at an outer surface of the refrigerant tubes and at an outer surface of the heat medium tubes, at least one tube among one of both groups of the refrigerant tubes and the heat medium tubes is disposed between other tubes of the other group, the refrigerant tubes and the heat medium tubes are spaced apart from each other, the feed air passage is provided on opposite sides of each refrigerant tube at a position between each refrigerant tube and an adjacent heat medium tube; and a controller configured to control the feed air volume adjustment portion when the temperature of the heat medium flowing into the composite heat exchanger is equal to or less than a predetermined heat-medium reference temperature before a predetermined reference time has elapsed since start of an operation of the external heat source device, the feed air volume adjustment portion decreases the volume of the feed air such that heat exchange between the discharge refrigerant and the heat medium is increased; and when the temperature of the heat medium is increased to a temperature higher than the predetermined heat-medium reference temperature, the feed air volume adjustment portion increases the volume of the feed air.

2. The air conditioner for a vehicle according to claim 1, wherein
an outer fin is coupled to the outer surface of the refrigerant tube and the outer surface of the heat medium tube, the outer fin being adapted to promote the heat exchange between both the heat exchangers, and to enable the heat transfer between the discharge refrigerant flowing through the refrigerant tube and the heat medium flowing through the heat medium tube.

3. The air conditioner for a vehicle according to claim 1, wherein
when a temperature of the heat medium is equal to or less than a heat-medium reference temperature before a predetermined reference time has elapsed since start of the operation of the external heat source device, the feed air volume adjustment portion increases the volume of the feed air, and
when the temperature of the feed air passing through the composite heat exchanger is increased to a temperature higher than a predetermined feed-air reference temperature, the feed air volume adjustment portion decreases the volume of the feed air.

4. The air conditioner for a vehicle according to claim 1, wherein,
when the volume of the feed air is decreased by the feed air volume adjustment portion based on the temperature of the heat medium, the heat medium flow-rate adjustment portion increases the inflow amount of the heat medium.

5. The air conditioner for a vehicle according to claim 1, wherein
a bypass passage is provided in the casing to allow the feed air blown from the blower to bypass the composite heat exchanger, and
the feed air volume adjustment portion is an air mix door for changing a ratio of the volume of the feed air flowing through the composite heat exchanger to that of the feed air flowing through the bypass passage.

6. The air conditioner for a vehicle according to claim 1, wherein
when a temperature of the heat medium is equal to or more than a temperature of the feed air blown by the blower toward the composite heat exchanger, the discharge capacity changing portion changes the refrigerant discharge capacity of the compression mechanism such that the temperature of the blown air passing through the composite heat exchanger approaches a predetermined target temperature.

7. The air conditioner for a vehicle according to claim 1, wherein
when a temperature of the heat medium is equal to or less than a predetermined heat-medium reference temperature, the discharge capacity changing portion changes the refrigerant discharge capacity of the compression mechanism such that the temperature of the blown air passing through the composite heat exchanger approaches a predetermined target temperature, and
when the temperature of the heat medium is equal to or less than the heat-medium reference temperature, the heat medium flow-rate adjustment portion decreases the inflow amount of the heat medium.

8. The air conditioner for a vehicle according to claim 1, wherein,
when adjustment of the refrigerant discharge capacity of the compression mechanism performed by the discharge capacity changing portion is restricted, the heat medium flow-rate adjustment portion increases the inflow amount of the heat medium.

9. The air conditioner for a vehicle according to claim 1, wherein
the external heat source device is a vehicle-mounted battery that generates heat upon charging, and
the heat medium flow-rate adjustment portion increases the inflow amount of the heat medium when the vehicle-mounted battery is charged.

10. The air conditioner for a vehicle according to claim 1, wherein
the first heat exchanger includes a refrigerant tank which gathers or distributes the refrigerant flowing through the refrigerant tubes,
the second heat exchanger includes a heat medium tank which gathers or distributes the heat medium flowing through the heat medium tubes,
the refrigerant tank is fixed to both the refrigerant tubes and the heat medium tubes on one end side in a longitudinal direction of the refrigerant tubes and the heat medium tubes, and
the heat medium tank is fixed to both the refrigerant tubes and the heat medium tubes on the other end side in the longitudinal direction of the refrigerant tubes and the heat medium tubes.

11. The air conditioner for a vehicle according to claim 10, wherein the refrigerant tubes and the heat medium tubes are arranged in lines in a flow direction of the feed air flowing through the feed air passage.

12. The air conditioner for a vehicle according to claim 10, wherein
the refrigerant tank is coupled to a refrigerant introducing portion and a refrigerant deriving portion for introducing the refrigerant into one end side of the refrigerant tank in the longitudinal direction, and
the heat medium tank is coupled to a heat medium introducing portion and a heat medium deriving portion for introducing the heat medium into the one end side of the heat medium tank in the longitudinal direction.

13. The air conditioner for a vehicle according to claim 1, wherein each refrigerant tube directly defines the feed air passage between a first side of the refrigerant tube and a first immediately adjacent heat medium tube and directly defines the feed air passage between a second side of the refrigerant tube opposite to the first side and a second immediately adjacent heat medium tube.

14. The air conditioner for a vehicle according to claim 1, wherein the feed air passage, a first refrigerant tube, the feed air passage, one of the plurality heat medium tubes, the feed air passage and a second refrigerant tube are stacked in this order in a width direction of the composite heat exchanger.

15. The air conditioner for a vehicle according to claim 1, wherein none of the plurality of refrigerant tubes is in direct contact with the plurality of heat medium tubes.

16. An air conditioner for a vehicle, comprising: a blower which blows air into a vehicle interior; a casing forming an air passage through which feed air blown by the blower flows; a composite heat exchanger disposed in the casing, the composite heat exchanger including a first heat exchanger configured to exchange heat between the feed air and a discharge refrigerant discharged from a compression mechanism for compressing a refrigerant in a refrigeration cycle, and a second heat exchanger configured to exchange heat between the feed air and a heat medium for adjusting a temperature of an external heat source device that generates heat in operation; a feed air volume adjustment portion disposed to adjust a volume of the feed air blown into the composite heat exchanger; a discharge capacity changing portion configured to change a refrigerant discharge capacity of the compression mechanism; a heat medium pressure-feed portion which pressure-feeds the heat medium; and a heat medium flow-rate adjustment portion which adjusts an inflow amount of the heat medium flowing into the second heat exchanger, wherein the composite heat exchanger includes an integrated combination structure of the first heat exchanger and the second heat exchanger so as to enable heat transfer between the discharge refrigerant flowing through the first heat exchanger and the heat medium flowing through the second heat exchanger, the composite heat exchanger is configured to change an amount of the heat exchanged among the feed air, the discharge refrigerant and the heat medium in the composite heat exchanger by adjusting at least one of the volume of the feed air, the refrigerant discharge capacity of the compression mechanism, and the inflow amount of the heat medium; the first heat exchanger includes a plurality of refrigerant tubes through which the discharge refrigerant flows, the second heat exchanger includes a plurality of heat medium tubes through which the heat medium flows, a feed air passage through which the feed air flows is provided at an outer surface of the refrigerant tubes and at an outer surface of the heat medium tubes, at least one tube among one of both groups of the refrigerant tubes and the heat medium tubes is disposed between other tubes of the other group, the refrigerant tubes and the heat medium tubes are spaced apart from each other, the feed air passage is provided on opposite sides of each refrigerant tube at a position between each refrigerant tube and an adjacent heat medium tube; and a controller configured to control the feed air volume adjustment portion when a temperature of the heat medium flowing into the composite heat exchanger is equal to or less than a predetermined heat-medium reference temperature, the feed air volume adjustment portion decreases the volume of the feed air such that heat exchange between the discharge refrigerant and the heat medium is increased; and when the volume of the feed air is decreased by the feed air volume adjustment portion based on the temperature of the heat medium flowing into the composite heat exchanger, the heat medium flow-rate adjustment portion increases the inflow amount of the heat medium.

\* \* \* \* \*